United States Patent [19]
Gagin et al.

[11] Patent Number: 5,630,757
[45] Date of Patent: May 20, 1997

[54] REAL-TIME MULTI-USER GAME COMMUNICATION SYSTEM USING EXISTING CABLE TELEVISION INFRASTRUCTURE

[75] Inventors: Reuven Gagin, Tel Aviv; Joseph Livshitz, Rosh Ha'ain; Erez Sharon, Cohav Yair, all of Israel

[73] Assignee: Net Game Limited, Israel

[21] Appl. No.: 346,389

[22] Filed: Nov. 29, 1994

[51] Int. Cl.$^6$ .................................................. A63F 9/24
[52] U.S. Cl. ........................ 463/43; 348/13; 364/281.3; 364/919.2
[58] Field of Search .................. 463/42, 40; 348/12, 348/13; 364/281.4, 281.3, 281.7, 919.2

[56] References Cited

U.S. PATENT DOCUMENTS

| | | | |
|---|---|---|---|
| Re. 32,282 | 11/1986 | Baer | 273/85 G |
| 4,572,509 | 2/1986 | Sitrick | 273/85 G |
| 4,856,787 | 8/1989 | Itkis | 273/237 |
| 5,083,800 | 1/1992 | Lockton | 273/439 |
| 5,220,420 | 6/1993 | Hoarty et al. | 358/86 |
| 5,251,909 | 10/1993 | Reed et al. | 273/439 |
| 5,283,734 | 2/1994 | Von Kohorn | 364/412 |
| 5,319,455 | 6/1994 | Hoarty et al. | 348/7 |

(List continued on next page.)

FOREIGN PATENT DOCUMENTS

| | | | |
|---|---|---|---|
| 0366581 | 5/1990 | European Pat. Off. | |
| 0495600 | 7/1992 | European Pat. Off. | |
| 0625760A1 | 11/1994 | European Pat. Off. | G06F 15/44 |
| 0634846 | 1/1995 | European Pat. Off. | |
| 0647914 | 4/1995 | European Pat. Off. | |
| 2218308 | 11/1989 | United Kingdom. | |
| 90/13086 | 11/1990 | WIPO. | |

OTHER PUBLICATIONS

Isaac Kong, et al., "CableNet: A Local Area Network Reservation Scheme", *IEEE Catalog No. 82 CH1739–2*, pp. 182–186, (1982).

European Search Report for International Application No. EP 95 30 8511 completed on Mar. 11, 1996 by Examiner J. Wentzel. 3 pages.

*Primary Examiner*—Jessica Harrison
*Attorney, Agent, or Firm*—Schwegman, Lundberg, Woessner & Kluth, P.A.

[57] ABSTRACT

A complete multi-user game playing environment is described which provides game playing services to cable television subscribers over existing cable networks. A game player located at the end of a cable network connection has a computer or other game playing device attached to the cable network through a front end adapter card. A game playing server is located at the cable headend and is equipped with back end communications cards for full duplex communications over the cable network with a plurality of game players. A plurality of uplink frequencies are used by the servers to communicate with the game players and a pluralities of downlink frequencies are used to communicate from the game players to the server. The communications are controlled by the server to prevent communication collision on the cable network over the same frequencies by having the server control a dynamically-changing time and frequency division multiple access protocol. The multi-user game playing server includes hardware and software where the game server includes a multi-threaded operating system which controls user access to a plurality of concurrently-operating games. The operating system allows users to join, play, change and quit any number of a plurality of provided games. Each of the plurality of concurrently operating games is a separate process in a multitasking environment while each of the operating threads are event-driven context-switched threads to control user access and communications over the cable network. The game playing information and game access information is traded between the server and the plurality of the game players using a predefined packet protocol which is very tolerant of lost packet data. The user's game equipment attached to the cable network includes devices such as personal computers, special set-top game controllers or existing video game playing equipment.

3 Claims, 22 Drawing Sheets

U.S. PATENT DOCUMENTS

| | | | |
|---|---|---|---|
| 5,349,682 | 9/1994 | Rosenberry | 364/281.3 |
| 5,361,091 | 11/1994 | Hoarty et al. | 348/7 |
| 5,396,630 | 3/1995 | Banda et al. | 364/281.7 |
| 5,412,720 | 5/1995 | Hoarty | 380/15 |
| 5,414,455 | 5/1995 | Hooper et al. | 348/7 |
| 5,423,555 | 6/1995 | Kidrin | 273/434 |
| 5,434,678 | 7/1995 | Abecasssis | 358/342 |
| 5,450,410 | 9/1995 | Hluchyj et al. | 370/94.1 |
| 5,471,474 | 11/1995 | Grobicki et al. | 370/85.2 |
| 5,473,362 | 12/1995 | Fitzgerald et al. | 348/7 |
| 5,481,542 | 1/1996 | Logston et al. | 370/94.2 |
| 5,485,197 | 1/1996 | Hoarty | 348/7 |
| 5,489,103 | 2/1996 | Okamoto | 273/433 |
| 5,499,241 | 3/1996 | Thompson et al. | 370/73 |
| 5,504,898 | 4/1996 | Klein | 364/281.3 |

REAL-TIME MULTI-USER GAME COMMUNICATION SYSTEM USING EXISTING CABLE TELEVISION INFRASTRUCTURE

FIELD OF THE INVENTION

The present patent application relates to communications services delivered via cable television infrastructure and in particular to multi-user game playing via cable television cable networks. The present invention also relates to a real-time operating system which performs multi-threaded processing of multiple data requests and multiple data response in a real time game playing communications network and system.

BACKGROUND OF THE INVENTION

Video games and computer games are well known in the art. Video games appear in many hardware platforms and in many software varieties. Video arcade games may be special devices for playing only one application program or game program while home video game devices generally accept cartridges to allow the user to select from a library of cartridges containing game application software. Such home video game machines and software are produced by such manufacturers as Nintendo®, Sega®, Atari®, Sony, and the like. Computer video games are also popular in which a personal computer is used as the hardware platform and application game software is loaded via floppy disk or CD-ROM.

Multi-user video game playing is also known in the art. Many of the game platforms allow two players to compete or cooperate in a game environment on a single hardware platform. Multiple platform, multiple player game environments are also known in which two hardware platforms are linked by a dedicated wire to allow two players to communicate in a common game environment. Nintendo® GameBoy® systems are an example of a wired connection in which two GameBoy® units may be connected by a wire so two user can play in a common game together.

A multiple user game playing network is described in U.S. Pat. No. 4,572,509 wherein a video arcade uses a dedicated, high-speed communications channel to link special arcade game stations to a control station for downloading of video game application software to allow several users to play together. This patent is limited in its use of a high-bandwidth channel and special hardware to allow a limited number of users at any given location. It lacks the ability to service a large number of subscribers distributed over a large area using limited bandwidth and within an unreliable communication environment.

Delivery of video and audio services via cables from a cable service provider to a residence is also known in the art as cable television. In this instance, a cable company is the source of audio and video signals at a location known as a headend, and the cables carrying the RF modulated audio and video services are delivered to customer sites. At selected places along the cable network amplifiers are used to boost the RF signals to compensate for the signal losses over long cable runs. One type of service envisioned for the cable TV market is the one-way downloading of video game software from a headend location. For example, U.S. Pat. No. 5,251,909 describes the downloading of video game application software over a wired communication network such as a cable TV network.

There is a need in the art for the delivery of multiple player, multiple game playing services to cable subscribers which provides real time two way communications in an uncertain communications medium. There is a further need in the art for the ability of multiple cable subscribers to play video games or the like in a multi-user game environment over a cable network. There is a further need in the art to provide a game playing hardware and software platform for game developers for multi-user game environments.

SUMMARY OF THE INVENTION

The present invention solves the above-mentioned problems and other problems which will be understood by those skilled in the art upon reading and understanding the present specification. The present invention describes a complete multi-user game playing environment which provides real time game playing services to cable television subscribers over existing bidirectional cable networks, which are inherently noisy and unreliable. A game player located at the end of a cable network connection has a computer or other game playing device attached to the cable network through a front end adapter card. A game playing server is located in the cable headend and is equipped with back end communications cards for full duplex communication over the network with a plurality of game players. A plurality of uplink frequencies are used by the servers to communicate with the game players and a pluralities of downlink frequencies are used to communicate from the game players to the server. The communications are controlled by the server to prevent communication collision on the cable network over the same frequencies by having the server control a dynamically-changing time division multiple access protocol. Game software components are loaded at the user site at the headend site and only game control information is exchanged between the site to allow high-quality graphics display at the user site without the need to exchange complete graphical information to each user. A special packet protocol and communication polling techniques are used which assumes an unreliable communications medium and operates in spite of lost data.

The present invention also describes a multi-user game playing hardware and software platform where the game server includes a multi-threaded operating system which controls user access to a plurality of concurrently-operating games. The operating system allows users to join, play, change and quit any number of a plurality of provided games. Each of the plurality of concurrently operating games is a separate process in a multitasking environment while each of the operating threads are event-driven context-switched threads to control user access and communications over the cable network. The game playing information and game access information is traded between the server and the plurality of the game players using a predefined packet protocol which is very tolerant of lost packet data. The user's game equipment attached to the cable network includes devices such as personal computers, set-top game controllers or existing video game equipment. The server platform is a distributed processing design in which processors in the communications cards relieve the server processor from much of the communications overhead.

BRIEF DESCRIPTION OF THE DRAWINGS

In the drawings, where like numerals refer to like components throughout the several views.

DETAILED DESCRIPTION OF THE PREFERRED EMBODIMENT

The specification for the multiple inventions described herein includes the present description, the drawings and a microfiche appendix containing the source code listings for the software components of the present invention. In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

System Overview

In the preferred embodiment, the present invention is designed to be attached to the existing infrastructure of a neighborhood cable television distribution network. A game server computer is attached to the cable distribution wires at the cable operator headend through special communication interface circuitry. The users' or subscribers' video game equipment is attached to the cable network through special communications interface circuitry. The subscribers' equipment communicates on a real time basis with the game server at the headend to allow the subscriber to play any number of games selectable from a library of games in competition with or in cooperation with other users or subscribers on the cable network. The user site hardware platform may be a personal computer (such as an IBM-type PC, an Apple-type computer, Amiga, etc), a game console (such as Nintendo®, Sega®, Atari®, etc.) or a special set-top terminal. The user site hardware is loaded with a first component of the software with a second component of the software running at the server site. The graphics information need not be transmitted from the server site and the user site since the graphics information exists at the users' site. Only status information about the game is transmitted between the sites.

The real time game server is capable of handling thousands of cable subscribers in a real time environment in which the response time between a user machine request and the server is deterministic or bounded. The system is based on Windows NT™ operating system and is portable between hardware platforms. The communications medium is inherently noisy and messages cannot be guaranteed to arrive at their intended destination due to bit error rates in excess of $10^6$. In order to maintain the real-time qualifies and fast response of the present invention, the entire communications protocol is designed to operate the system effectively even in the face of lost data.

Hardware Overview

Figure 1A:
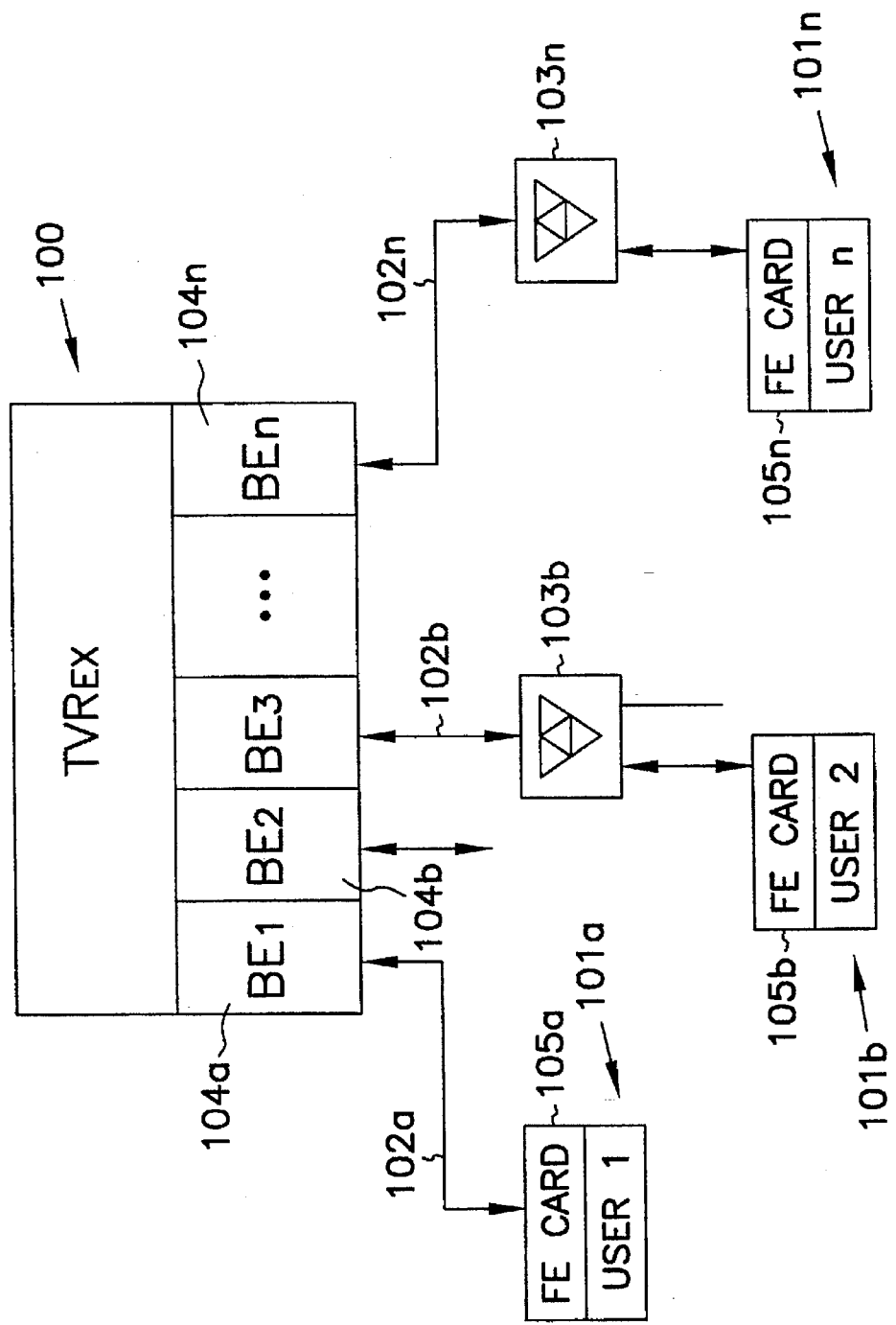
FIGS. 1A and 1B are a block diagrams of the multi-user game playing network including a single game server located at the cable headend and a plurality of users located at the user sites.
Figure 1B:
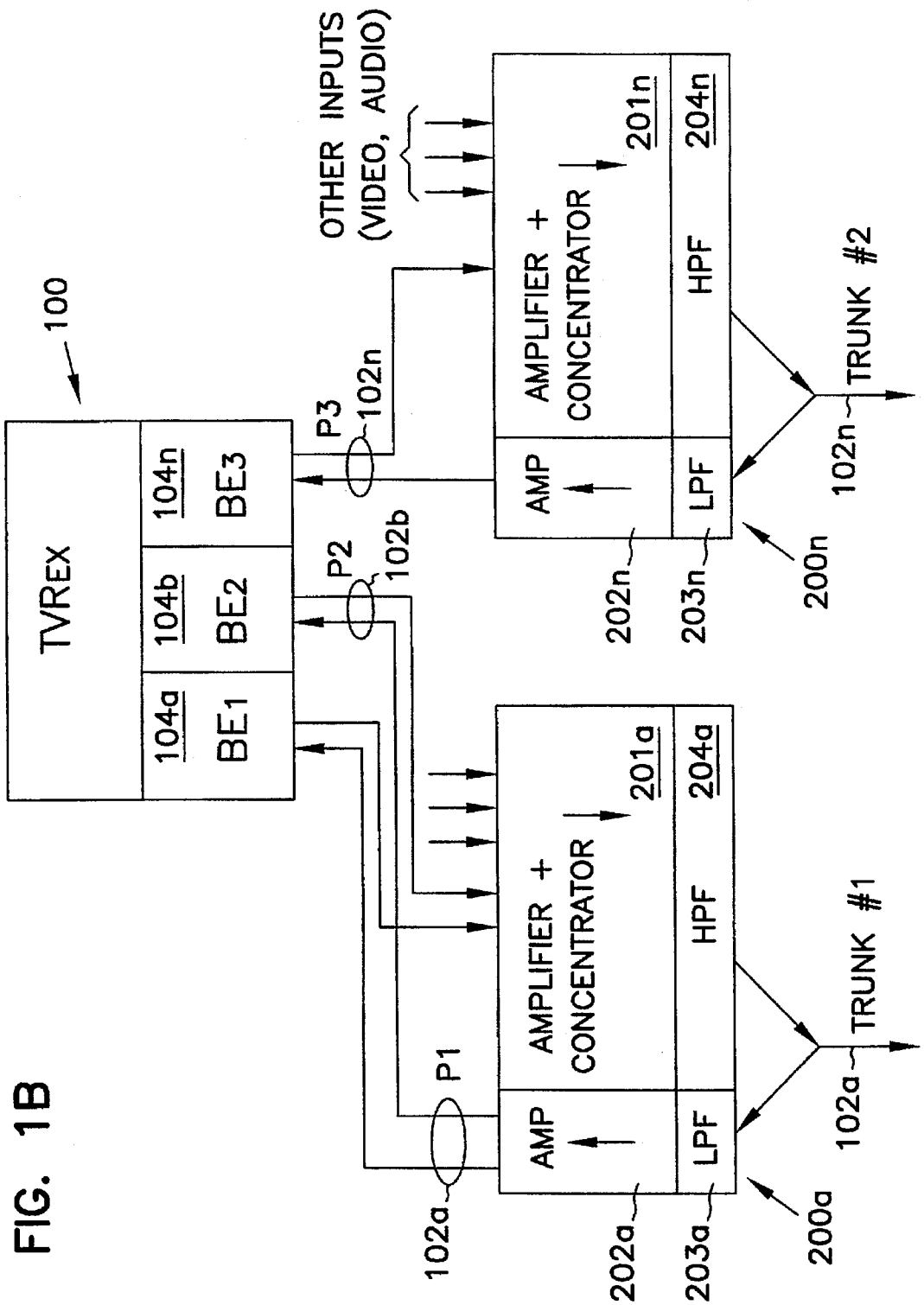
Figure 2:
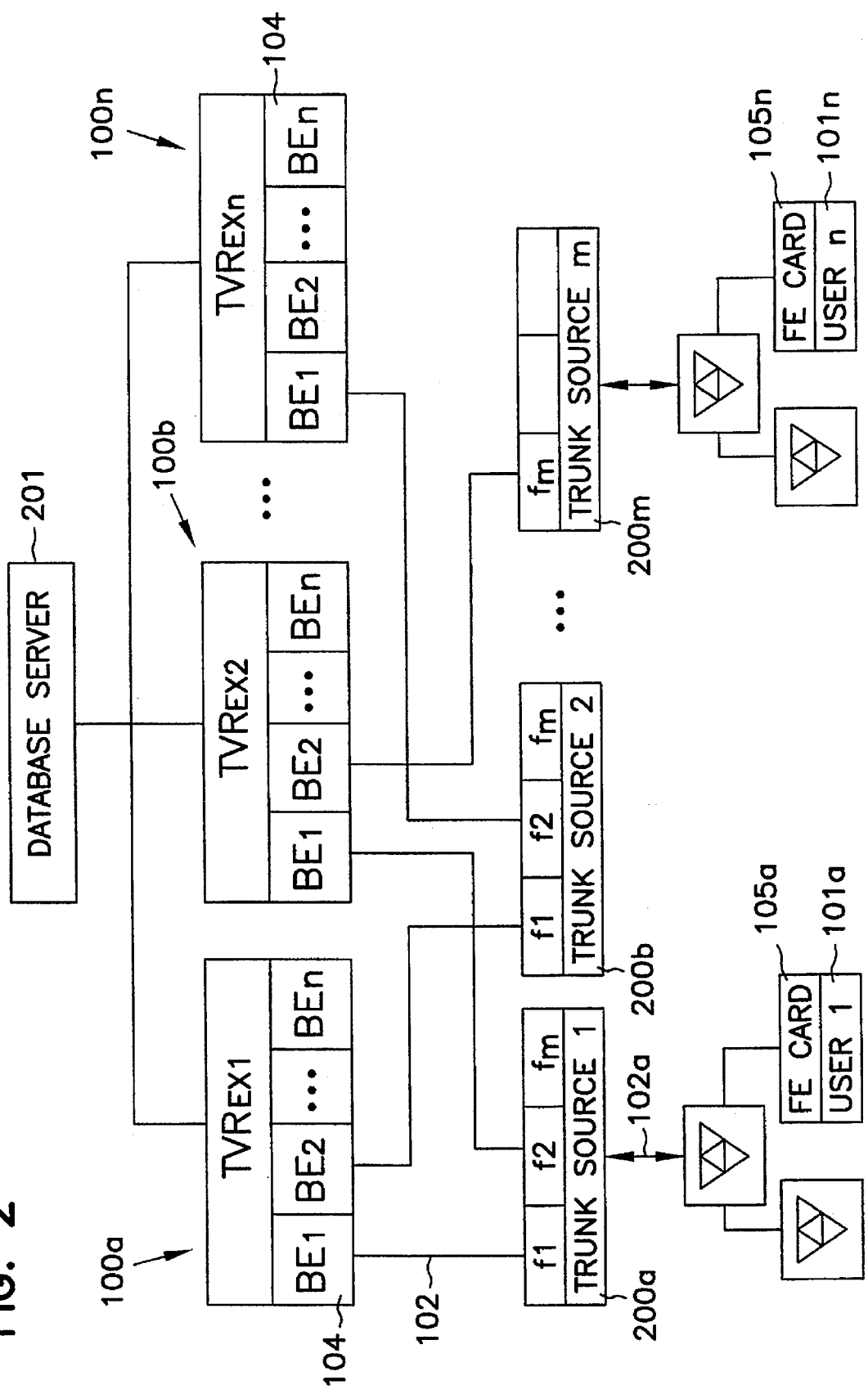
FIG. 2 is a block diagram of the multi-user game playing network including a plurality of game servers located at the cable headend and a plurality of users located at the user sites.

A basic implementation of the present invention is shown diagrammatically in FIGS. 1A and 1B and a larger configuration to handle an expanded number of users is shown diagrammatically in FIG. 2. The game server 100 is termed TVRex which contains a processor running multi-user game (MUG) playing operating system software. In the preferred embodiment of the present invention, the game server hardware platform is an Inter™ Pentium™-based computer using single or multiple processors running the Windows-NT™ operating system. Upon reading and understanding the present specification, those skilled in the art will readily recognize that a wide variety of hardware platforms and operating systems can be substituted for the systems used here. For example, a dual-Pentium™ hardware platform or a MIPS machine, or the like, could be substituted to provide the performance needed to implement the present invention.

The game server hardware and software system 100 communicates with user hardware platforms 101a, 101b . . . , 101n, which will be generally referred to as user hardware platform 101. The communications medium is a bidirectional cable TV wiring system which is typically subdivided into subnets 102a, 102b, . . . , 102n, the subnets being generally referred to as subnet 102. The use of subnets 102 in a large cable television network is to minimize the need for excessive amplification along the network. The overall cable system may serve 100,000 users or more so subnets are used to limit the number of users on each subnet to several thousand subscribers. The subnets 102 of the cable network require amplification and so bidirectional amplifiers 103b, . . . , 103n are used and generally referred to as bidirectional amplifier 103. The amplifiers 103 amplify the high band signals on the downlink (from the server to the users) and they amplify the low band signals on the uplink (from the users to the server).

The TVRex game server 100 communicates over the cable network using a plurality of communications cards $BE_1$, $BE_2$, . . . , $BE_n$, labeled 104a, 104b, . . . , 104n, respectively, shown in FIG. 1A, which are generally referred to as Back End (BE) communications card 104. The BE card 104 communicates over a plurality of frequencies and can be attached to one or more of the cable television subnets 102. Each user hardware platform 101a, 101b . . . , 101n, has a corresponding communications card $FE_1$, $FE_2$, . . . , $FE_n$, labeled 105a, 105b, . . . , 105n, respectively, shown in FIG. 1A, which are generally referred to as Front End (FE) communications card 105. The BE 104 and FE 105 communications cards are nearly identical except the uplink and downlink frequencies are reversed. The frequencies used will be described more fully below.

A more detailed view of the cable TV headend and the attachment of the TVRex game server 100 is shown in FIG. 1B. The headend site contains modulator and concentrator circuits 200a, . . . , 200n, which combine a plurality of RF modulated video and audio sources for transmission over the bidirectional cable subnets 102a, . . . , 102n. The headend source 200 for each subnet 102 handles the communications in both directions by separate circuits. The signals sourced by BE card 104 are amplified and combined with the signals of other signal sources (such as modulated video and audio) through amplifier and concentrator circuit 201, filtered via high pass filter (HPF) 204, and sent out the cable TV net 102. Signals sourced by the FE communication card 105 of user hardware platform 101 are received by headend circuit 200 from cable television subnet 102. The signals received are low pass filtered (LPF) by filter circuit 203 since they reside only in the low band areas. The signals are amplified, if necessary, by amplifier circuit 202 and are sent to one of the BE communications cards 104 of the game server 100.

The BE communications cards 104a, 104b, . . . , 104c, of TVRex server 100 communicate in frequency pairs $P_1$, $P_2$, . . . , $P_n$ with the user game platforms via modulator and concentrator circuits 200a, . . . , 200n, also known as trunk source circuits. The frequency pairs correspond to a downlink frequency and an uplink frequency. The downlink frequency is located in the upper band frequencies of the cable TV spectrum (described more fully below in conjunction with FIG. 10). The uplink frequency is located in the lower band of the cable TV spectrum. Together, the downlink and uplink frequency pair define a single channel through with a plurality of user hardware platforms may communicate to the TVRex server. As shown in FIG. 1B, a plurality of channels exist between the TVRex server and the users on the cable TV network.

An expanded version of the present invention is shown in FIG. 2. In this configuration, a plurality of TVRex game server hardware platforms are shown as $TVRex_1$, $TVRex_2$, . . . , $TVRex_n$, labeled as 100a, 100b, . . . , 100n, respectively, in FIG. 2. This plurality of TVRex servers collectively make up a complete real time operating system with the individual servers operating as naked kernels. The control threads of the TVRex servers operate independent of the game applications that are run on it and each is able to run any game application submitted by third party developers. One TVRex server 100 is designed to handle in excess of 1000 users simultaneously such that multiple TVRex servers 100 may be needed to manage large cable systems. A single TVRex server 100 may also manage in excess of 150 different game application.

Referring once again to FIG. 2, the plurality of TVRex servers 100a, 100b, . . . , 100n, each are connected to a database server 201 which is used to collect and manage information about the system. The database contains information about the cable subnets such as error data, interference reports, repair requests, etc. The database server also shares information regarding the users such as billing data, individual user preferences regarding selected games, FE card address, discount information for active users, user nicknames, etc. The database server also contains information about all game applications. The TVRex servers 100 communicate with the database server using a standard interface (such as b-treive) using a standard database interface language such as an SQL bridge. The database server is instrumental in setting up and maintaining the cyber community, described more fully below.

Each of the plurality of TVRex servers 100a, 100b, . . . , 100n, are also connected to BE cards 104a, 104b, . . . , 104n, as shown in FIG. 2. Each BE card 104 is able to handle a single pair of uplink and downlink frequencies $f_x$ where x is a selectable frequency pair. Each trunk source circuit 200 connects the frequency pairs to the cable subnet 102 to which it is attached. Note that each trunk source circuit 200 idles a set of frequency pairs designated as $f_1, f_2, \ldots, f_M$. It does not matter which TVRex is connected to the particular frequency pair allowing a wide flexibility in designing a TVRex system to meet the needs of a large number of cable subscribers. For example, each BE card 104 can manage at least 300 users in the same geographical area on one subnet 102. A single TVRex server 100 can be connected through a plurality of BE communications cards 104 to all the trunk source circuits 200 to service only one frequency pair $f_x$ thereby allowing a large geographic are to be serviced. A single TVRex server may also be connected through a plurality of BE communications cards 104 to a single mink source circuit 200 to service a plurality of frequencies on a single mink. Other combinations illustrated in FIG. 2 are possible as long as two TVRex servers 100a and 100b are not designated to operate on the same frequency pair on the same wire. The former combinations are allowed because each BE communications card idles its own polling in a particular frequency pair or channel. The latter combination is disallowed because the two TVRex servers may attempt to control the polling on the same subnet at the same frequency. The polling algorithm used in the preferred embodiment of the present invention is described more fully below.

The BE communications cards 104 only handle a single frequency pair but are capable of servicing a wide variety of selectable frequency pairs. The frequency pairs or channels assigned to a particular BE communication card is under control of the TVRex server to which it is attached and the frequency pair can be changed. The frequency pair used by the FE communications card 105 of the user hardware platform 101 are changeable under software control depending upon which game the user wishes to play and which group of cable subscribers the user wishes to play with. Cable subscribers or game players on any subnet of the cable network can play each other when they choose the same frequency. Table 1 describes the frequency pair allocation which are allowable in the present system

TABLE 1

Frequency Pair Matrix

| Subnet or Trunk | Frequency Pairs Available | | |
|---|---|---|---|
| | f1 | f2 | f3 |
| 1 | A | A (~~B~~) | B |
| 2 | A (~~C~~) | C | C |
| 3 | C | B | B |

As shown in Table 1, subnet or trunk number 1 can be connected to server A on frequency pair f1 and server A on frequency pair f2, but subnet or trunk 1 cannot also be connected to server B on frequency pair f2 since server A and B would collide when both attempt to poll the subnet on the same frequency pair. In a like fashion, subnet or trunk number 2 can be connected to server A on frequency pair f1 but subnet or trunk 2 cannot also be connected to server C on frequency pair f1 since server A and C would collide when both attempt to poll the subnet on the same frequency pair.

BE/FE Communication Cards

Figure 7:
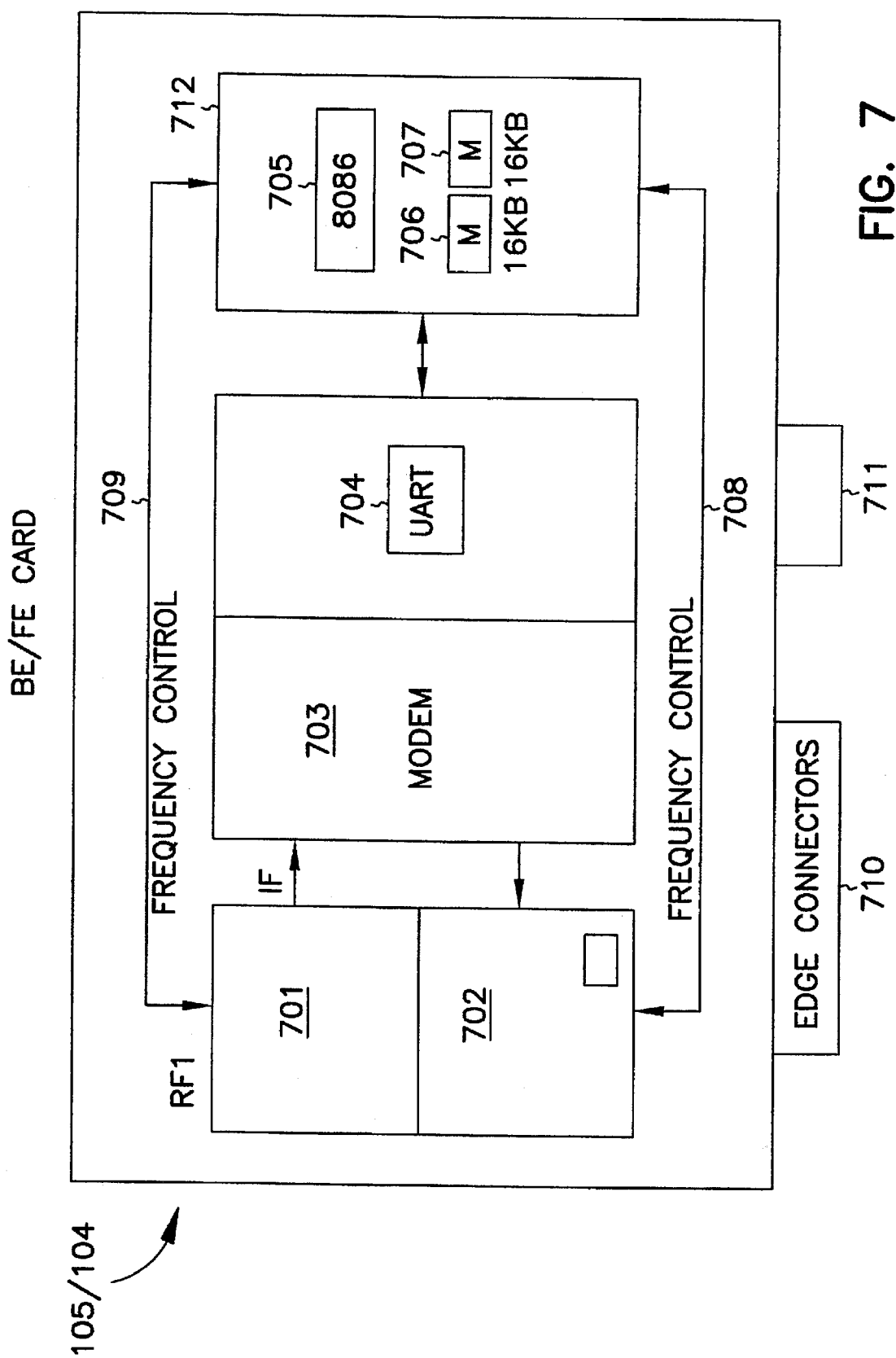
FIG. 7 is a block diagram of the BE (Back End) and FE (Front End) communications card of FIGS. 1 and 2.

One of the important features of the present invention is the distributed nature of the decision making regarding communications packets. FIG. 7 is a block diagram of the BE (Back End) and FE (Front End) communication card of FIGS. 1 and 2. The FE and BE cards contain communications processors which handle much of the communications processing overhead thus freeing the server processors and the user hardware platform processors from the burden of managing the communication channel.

The BE (Back End) communications cards 104 and the FE (Front End) communications cards 105 are nearly identical and are designed to handle a single channel comprised of a pair of frequencies: the uplink frequency and the downlink frequency. The cards are capable of changing frequencies or frequency pairs, much like changing television channels, to select another group of games or users playing on other nets. The designation of the Back End card refers to the fact that the TVRex operates as a "back end" processing operating system for a particular game from the users' perspective and the Front End card refers to the fact that the users hardware platform is a front end processor for a particular game, also from the users' perspective. The cards 104, 105 communicate over the channel using a Time Division Multiple Access (TDMA) algorithm which makes maximum use of the channel by active users and minimizes the impact on the channel usage by inactive or sleeping users. In the alternative, a Frequency Division Multiple Access (FDMA) algorithm can be used in which a large number of narrow-band frequencies are shard among the FE and BE cards.

FIG. 7 is a block diagram of the BE (Back End) and FE (Front End) communications card of FIGS. 1 and 2. The effective data rate between the cards is limited due to the TDMA protocol, as described more fully below in conjunction with the description of the polling protocol. Since a small time slice is allocated to the user in every polling cycle, a low effective communication rate between an FE/BE card pair is realized. A high data rate is not necessary for the present invention since, as described below, only status information is exchanged between the user site and the server site. Also, since a wide variety of user hardware platforms are envisaged, the low data rate may be the only comfortable data rate for slow processors such as the type found in Nintendo® machines. The Nintendo® hardware is connected to the cable network through a serial link from the game cartridge port to the FE cable adapter. This serial connection is limited in effective data rate and the processor is limited in processing power such that an effective communication rate of 14.4 Kbaud is quite adequate. Of course, other type of user hardware platforms such as Pentium™-based personal computers are linked into the system having the capability of handling very high data rates, but these data rates are not necessary for the game playing environment described here.

The FE/BE card pairs combine to operate a full duplex channel having an uplink frequency between 55 and 800 MHz, and a downlink frequency between 5 MHz and 35 MHz, as described below in conjunction with FIG. 10. This full duplex pair of frequencies is termed a single channel in the present description. Referring to FIG. 7, the FE or BE card is shown in a block diagram form. The card is designed to fit a standard AT bus for a personal computer through edge connectors 710 and 711. Those skilled in the art will readily recognize that the communications adapter card shown in FIG. 7 may be configured in a wide variety of ways to interface to a wide variety of user equipment, including a SCSI bus, a local bus, etc. The card 105/104 has an on-board processor which, in the preferred embodiment of the present invention, is an Intel® 8086 processor. The processor area 712 of the card 104/105 has two memory banks 706, 707 of up to 16 Kbytes each. The first memory bank 706 is an internal memory used by the processor. The second memory bank 707 is a shared memory bank which is part of the directly addressable memory space of both the card processor 705 and the processor of the user hardware platform. This shared memory 707 is alternatively written/read by the card processor and the user hardware platform processor on alternate memory cycles to avoid collision.

The middle area of card 105/104 contains a modem which can communicate up to approximately 1Mbit/second and a UART (Universal Asynchronous Receiver/Transmitter) 704 which interfaces between the modem and the memory 706 of the processor area 712.

The RF portion of the card 105/104 is shown to the left of the card in FIG. 7. The RF receiver portion 701 of the FE card 105 receives the downlink frequency of the frequency pair at a preselected frequency between 55 MHz and 800 MHz. The RF receiver portion 702 of the FE card transmits the uplink frequency of the frequency pair at a preselected frequency between 5 MHz and 35 MHz. The BE card is just the opposite. The RF receiver portion 701 of the BE card 104 receives the uplink frequency of the frequency pair at a preselected frequency between 5 MHz and 35 MHz. The RF receiver portion 702 of the BE card 104 transmits the downlink frequency of the frequency pair at a preselected frequency between 55 MHz and 800 MHz. The RF portions are standard Phillips tuners, and can be tuned using the digital lines 708 and 709 to allow the processor 705 to change frequencies using the I²C communications interface. The IF frequencies between the RF tuner 701 and the modem is approximately 33 MHz.

The processor 705 operates to interpret packets 900 received from the net to determine if the information is intended for this particular user. Also, the processor 705 unloads the relevant information and passes it to the user hardware platform for use by the user's component of the game application software. Information packets to be sent from the user hardware platform to the server buffered and queued up for transmission in the common memory buffer 707 for transmission by the processor 705 during the appropriate polling cycle. The information is packetized in the game application.

Polling Protocol

Figure 8A:
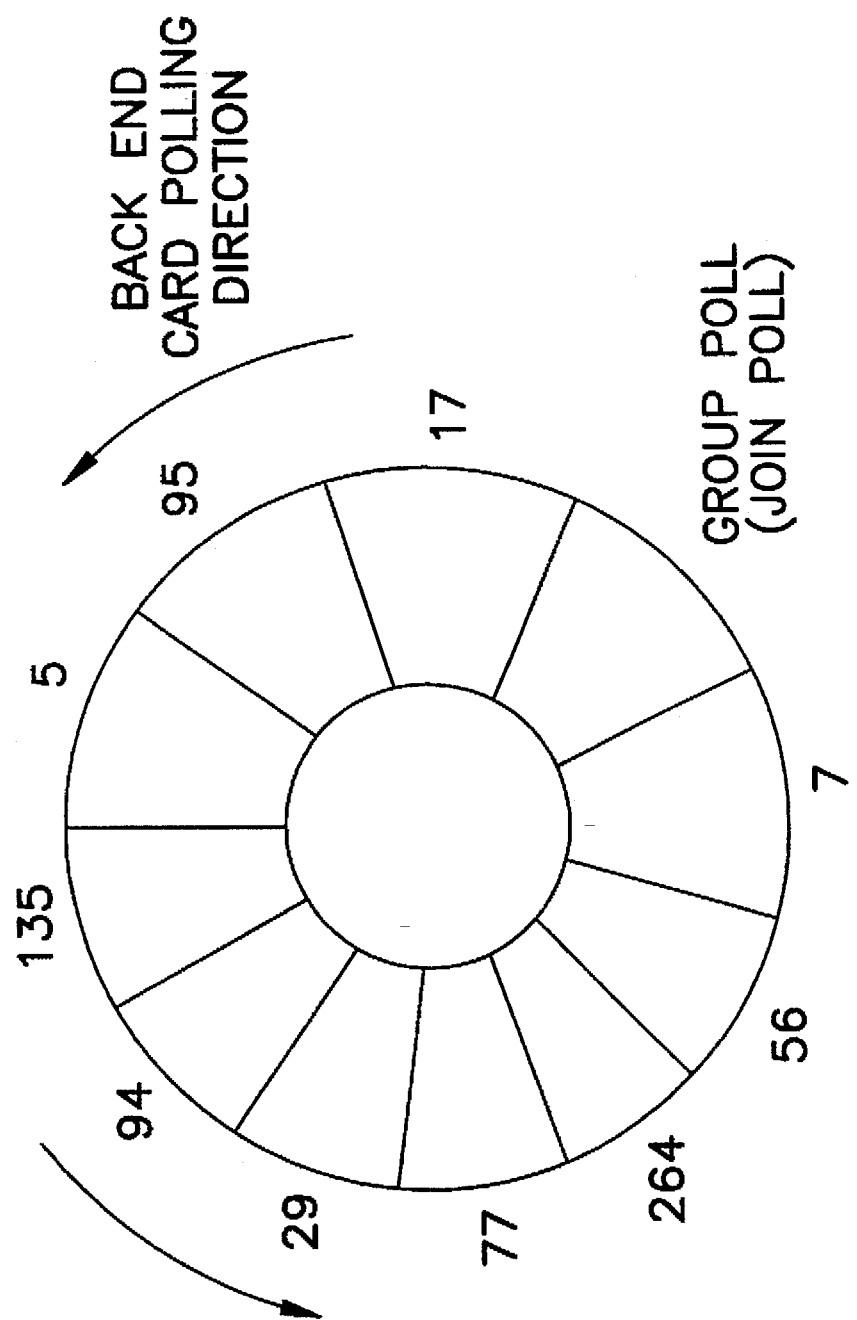
FIGS. 8A, 8B and 8C are diagrams of the polling algorithm used by the FE and BE communications cards of FIG. 7.
Figure 8B:
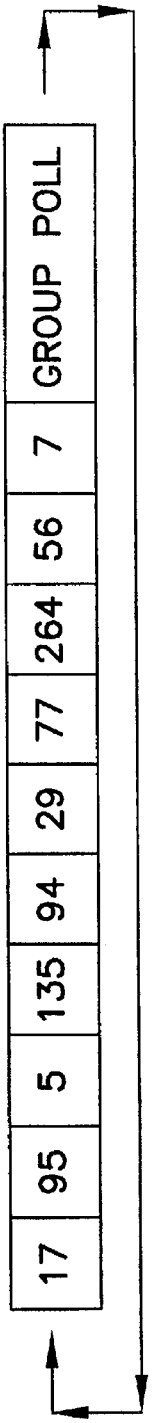
Figure 8C:
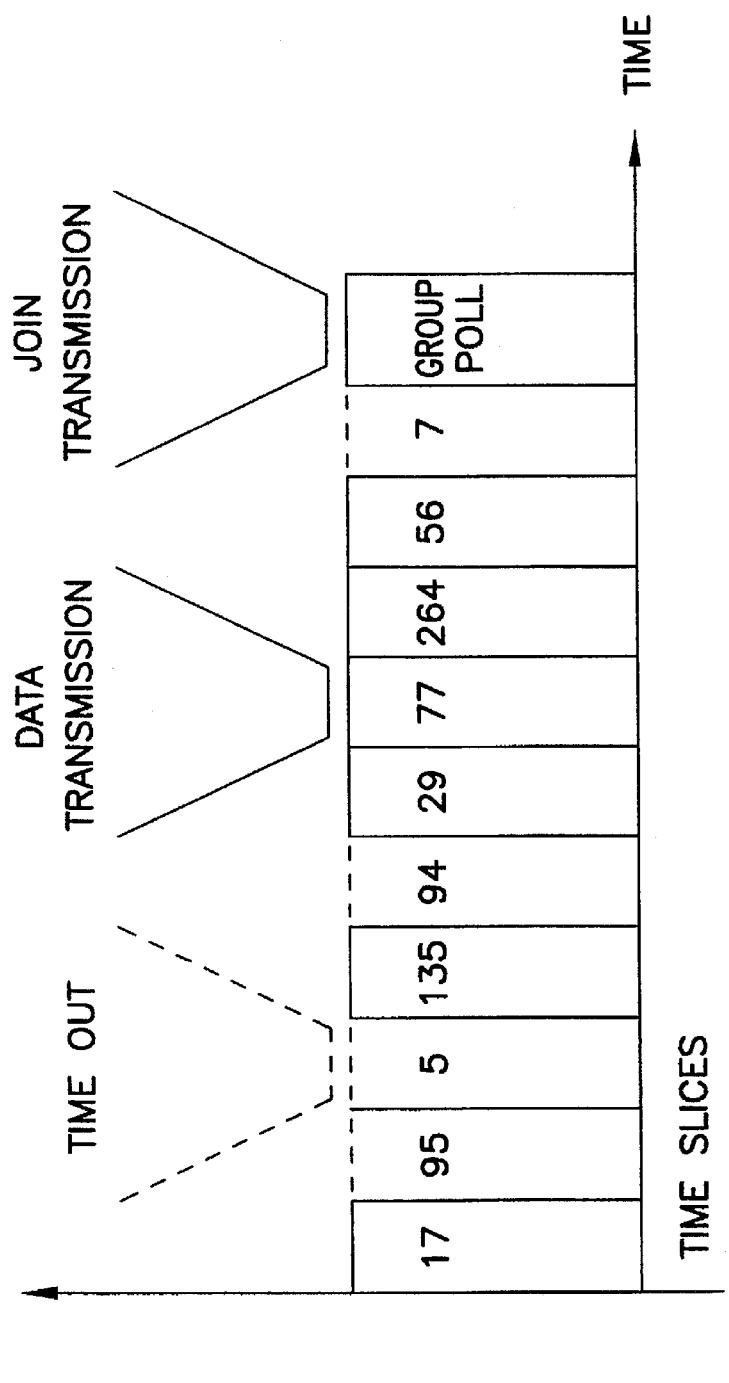

FIGS. 8A, 8B and 8C are diagrams of the polling algorithm used by the FE and BE communications cards of FIG. 7. As described above, the FE and BE cards may operate on a variety of frequency pairs in an FDMA (Frequency Division Multiple Access) technique. Within a particular frequency, a strict polling protocol is used in a TDMA (Time Division Multiple Access) technique. Referring to FIG. 8, the BE card polls the FE cards and the FE cards are allowed to respond only when polled such that their response is in the time slot shown in FIG. 8A. For example, on the downlink channel, the BE card will broadcast a message telling the specific address of the FE card which may respond during a particular time slice. In FIG. 8A, card 17 is first requested to respond, followed by FE card address 95, then 5, etc. The polling order is strictly by a dynamic polling list and is in a random order. If some applications require less polling than other applications, then the FE card may be polled every other time around the polling cycle. As more FE cards are active on a particular subnet, the polling cycle takes longer to complete.

Referring to FIGS. 8B and 8C, another view of the cyclical polling algorithm is shown. When the downlink polls a specific FE card address, the FE card responds on the uplink frequency for this particular frequency pair (channel). When an FE card is polled, it may not have any data packets 900 to send and so it stays silent. As described below, staying silent too long has its consequences since the FE card may time out and will be removed from the polling list as an inactive member. As shown in FIG. 8C, FE card address is in a time out condition which means that it will shortly be removed from the polling list. FE cards 95, 94 and 7 also have not responded to the poll and the T2 Timer Thread, described below, will begin to time their inactivity for a time out condition.

Since polling is based upon membership in a polling list, an inactive FE card needs to have itself placed onto the polling list in order to communicate with the server. That is the function of the open time slot or the join slot. An open slot is always reserved in every polling cycle to allow inactive users to join the polling cycle at the communication layer. Once joined in the polling cycle, the user can then join a game at the operating system layer, and then communicate with the game at the application layer.

To join a polling list in a particular frequency pair, the inactive FE card waits for the group poll time slot to respond. The group poll time slot is indicated by a group poll packet being sent on the downlink frequency by the BE card of the server. When the FE card responds, its response is noted by the BE card and if proper and ungarbled, then it is added to the polling list. In order to remain on the polling list, the FE card must properly join the system through the TVRex server level. The T1 dispatcher thread described below will join the user corresponding to the FE card to prevent the user from being removed from the polling list.

In attempting to join the system, two or more FE cards may attempt to join at the same time causing a communication collision during the group poll time slot. In order to regulate the join of these multiple FE cards, the BE card will begin to restrict the join algorithm so that only specific subsets of FE card addresses are allowed to join. For example, the BE card may restrict the group poll by sending group join polling packets which will only allow certain addresses to respond. In this fashion, a binary filter or address mask is used so that only half of the FE card addresses can respond at a given poll. If collisions continue to occur, the group join is continually whittled down until a clear join request is received from a single FE card due to it being isolated from the other cards seeking to join. By continually masking the addresses which can respond during the group poll in a binary or b-tree technique, collisions can be cleared in a matter of a few seconds. The global design nature of the present system assumes that the network is unreliable so the FE and BE cards are designed to be persistent since the cards assume that packets are continually being lost.

The time around the polling cycles is bounded but it is asynchronous. The system must poll each active user at a 10 Hz minimum so the number of active users on a heavily loaded subnet must be limited for a particular frequency. Also, the size of the data packets is variable so the amount of time spent for each user around the polling loop is unpredictable, but the number of users is limited to within worst case timings to maintain the system at the 10 Hz polling minimum.

Once the FE 105 and BE 104 cards establish a connection through a join poll in the polling list at the physical level, the join of the server must then occur at the logical level. The physical polling and communication between the FE and BE cards, as described above, is handled by the local FE/BE card processors 705 and is transparent to the user hardware equipment 101. Therefore, the processor of the user hardware 101 is free to handle the graphics and sound processing necessary for modem games and is freed from the high-repetition interrupts at the communications level.

Communications Data Packet

Figure 9:
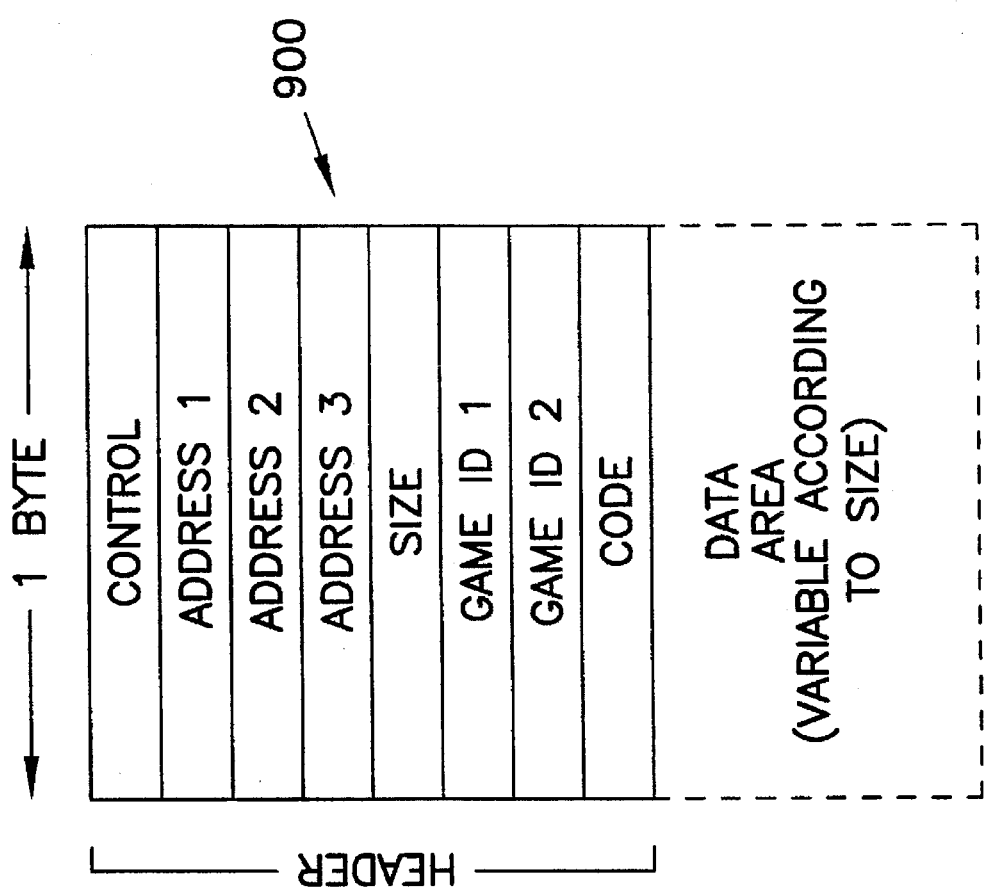
FIG. 9 is a diagram of the data packet communicated between the FE and BE communications cards of FIG. 7 and between processing levels at the server and between processing levels at the user processor.

FIG. 9 is a diagram of the data packet communicated between the FE and BE communications cards of FIG. 7 and between processing levels at the server and between processing levels at the user processor. The packet shown in FIG. 9 is one byte wide (8-bits) and of variable length. The bits are ordered in the Intel® (little endien) format in which the most significant bit is on the right. The packets are given CRC codes after the user has joined a game, as described below. The packets 900 of FIG. 9 do not contain check sums since these type of data checks require processing overhead which is intolerable in the present invention. The present system is designed to operate over an unreliable communications network and since the present invention is designed to support an entertainment system, unreliable communication can be tolerated. Those skilled in the art will readily recognize that a layer of checksum error checking could be added to the present system to improve communication reliability, depending upon how much the system can tolerate a degradation in the speed and responsiveness of the communication net.

The control byte describes the type of packet 900 in FIG. 9. The three byte address field describes the FE card address of the user. The size of the packet is placed at the fifth position which describes the length of this variable length packet including the header area, The game ID (identification) is two bytes which identifies which game this packet is destined for. Finally, the code byte in the header is one byte and is sued to describe 256 individual codes. The use of codes reduces the need for the data area in many cases making the packet quite short. The variable size data area is used by the game applications and may contain any data in any format as defined by the game software.

The data packets are sized between a minimum of 8 bytes and 256 bytes, although using the maximum size packet is discouraged The packet is standardized for use throughout the system so that all hardware components and software components are knowledgeable about the format of this packet. There are no overlay protocols in the layers of the system such that the same packet is used at all levels. This allows for intelligent filtering of the packets at the FE card level by the FE processor. Another feature of the standard packet used in the present invention is the fact that every packet is independent and self-contained. One packet does not rely on the packet that came before it or the packet which will follow. This is different from protocols such as TCP/IP in which an MTU (maximal transmission unit) is transferred on an ethernet, or the like, and a router breaks up the packet into subpackets. If a subpacket is lost, the entire transmission must be retransmitted. In contrast to this, the present system has been designed from the highest layers to the lowest layers, to tolerate the loss of a packet. The communications protocol is very tolerant of the unreliable communications medium found in the cable TV network, especially on the uplink (lowband). The game application software is also aware that the packet size will be limited and that packets will be lost.

When the packet is being sent on the downlink (from the server to the user) the address field will either be a specific address of an FE card or the address will be a broadcast indicated by an address of −1. The game ID indicates which game sent the message. The code field is an 8-bit field which identifies 256 different possible control codes. The codes are divided into ranges where 0 to 63 are reserved system codes and 64 to 255 are assignable user codes (assigned and used by the game applications).

When the packet is being sent on the uplink (from the user to the server) the address field will be a specific address of the sending FE card. The game ID indicates the game to which the message is being sent (target game). The code field is the same 8-bit field which identifies 256 different possible control codes, with 0 to 63 still reserved system codes.

The FE and BE cards are allowed to use system codes and these cards filter out packets which use system codes from the game application software both at the server and at the user site. An example of a system code is a request to join an application. The FE card constructs the join request in a packet using system codes, but the application software does not see this packet since it is filtered and interpreted by the BE card at the server site. The system codes are very much like protected or privileged instructions in an operating system The control code in the first byte of the packet has several tasks that the it can serve: polling, specific send, group polling or join polling and multicast/broadcast reserved for TCP/IP communications. The use of these control codes is described above in conjunction with the polling and the BE/FE cards.

Figure 10:
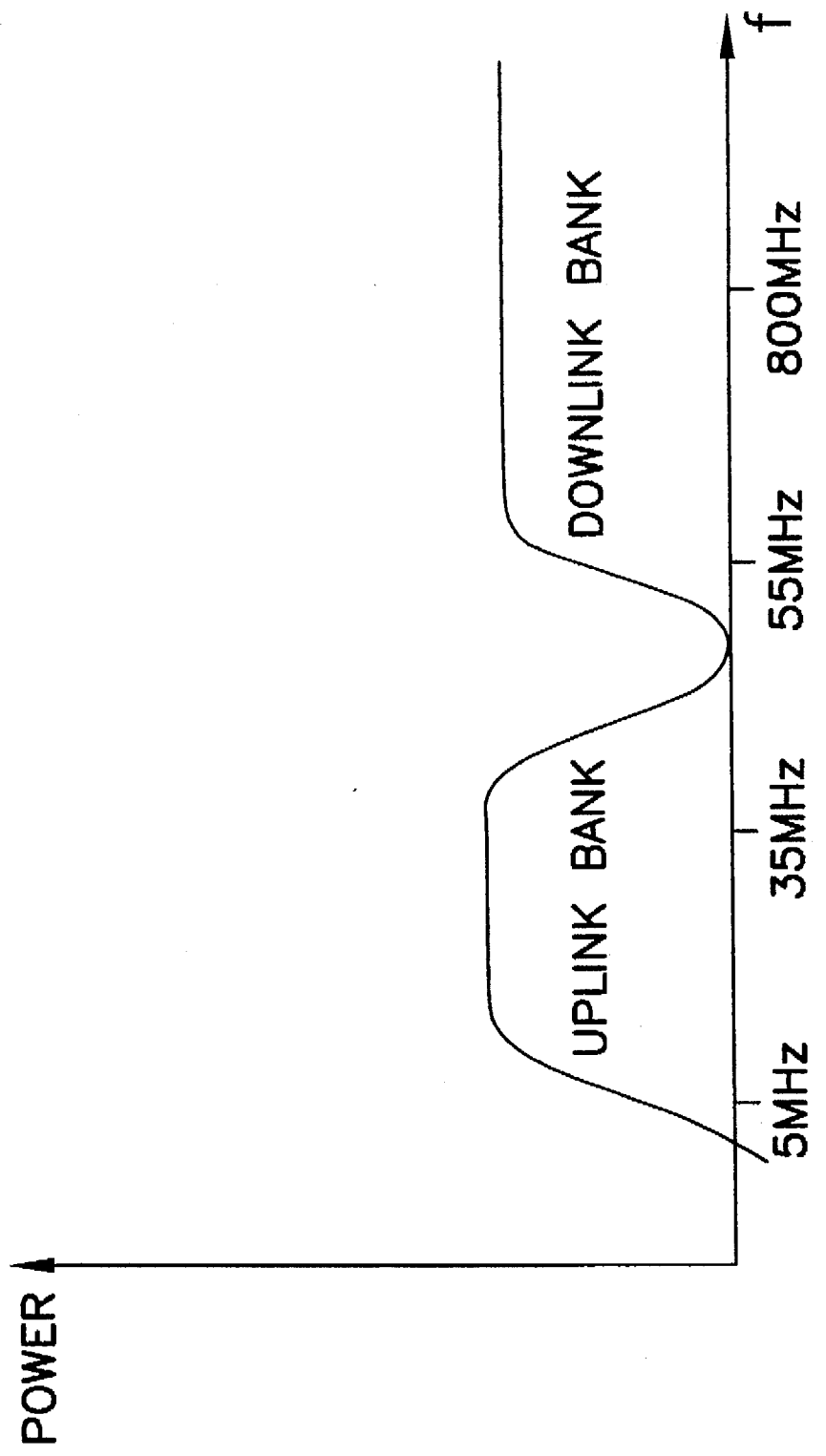
FIG. 10 is a diagram showing the frequency band allocation for the uplink channels and the downlink channels on a cable television network used by the communication card of FIG. 7.

FIG. 10 is a diagram showing the frequency band allocation for the uplink channels and the downlink channels on a cable television network used by the communications card of FIG. 7. The downlink frequency is above 55 MHz, selectable by the FE and BE cards, and is allocated by the cable company. The allocated frequencies may be narrow band frequencies placed between cable TV channels, or an entire dedicated 6 MHz television channel may be allocated for a group of operating downlink frequencies. The other half of the channel pairs of frequencies are in the lower band area between 5 MHz and 35 MHz. Both the uplink and downlink frequencies are in a very noisy environment leading to an unreliable communications medium.

Real Time Operating System Threads

The real time game operating system in the present invention is written in Windows NT™ code to run as an operating system for the present invention. The use of the term real time in the present invention means that the query-response cycle time between the user's equipment and the server is deterministic or bounded.

In the present real-time communications system, a game communications cycle between a user to the TVRex server and back to the user should be bounded to between 150–200 milliseconds to create a real time response similar to arcade type game playing. To provide this type of performance, the tasks performed by the real time operating system are divided into threads having different context switching priorities. One group of top priority input threads handles the communication input, and a single top priority output thread handles the communications output. In this fashion, all communications appear to the user to be real time and all input/output handled by the TVRex operating system is handled as top priority operation.

TABLE 2

| TVRex Operating Threads |
| --- |
| T1 = Dispatcher (one per BE communications card) |
| T2 = Timer |
| T3 = Game Switch |
| T4 = Game Server (DLL) Control Mailslot |
| T5 = Game Server Broadcast Mailslot |

As shown in Table 2, a plurality of operating threads are used in the Windows NT™ system to handle operation of the server. There is one T1 dispatcher thread per BE card 104 attached to the TVRex server 100 and one output thread T5 to deliver the data to all channels. Each channel is a single frequency pair handled by one BE communications card 104. When the particular thread is not needed (i.e., there is no incoming communications requests from the BE cards) the threads "sleep" and do not request a context switch. The sleeping threads allow the server processor to service other threads and games processes. The T1 and T5 threads are real-time threads meaning the response time for handling the communications is bounded and deterministic.

The timer thread T2 monitors the activity of the users and game processors to determine when users become inactive or game processes become unused. In the case of user activity, timer thread T2 keeps track of the last 30 seconds of activity to determine if the user has ceased using the system This is important in a system which charges user activity by the minute since a player of a game may walk away from a game and forget to return. It is preferable to terminate the user's billable activity rather than letting the game run unattended and charging for the use.

The game switch thread T3 handles the switching of a user between two games, from no game to a game or from a game to no game. This switch handles the transfer of the user status in a non-real-time operation since the game switch can occur quite slowly from the user's perspective.

The cable television network is not reliable so special handling of change status requests is needed to prevent errors. For example, if a user chooses to switch from game A to game B, the FE communication card 105 of the user's hardware platform 101 sends a data packet 900 (described more fully below) to the TVRex server 100 the a game switch should occur. If the game switch packet 900 does not arrive intact at the server 100, the server 100 will continue to send messages to the user's hardware 101 as if it were still participating in game A. The game packet 900 could be mistakenly translated by the user hardware platform 101 as though the packets 900 were intended for game B. Thus, the purpose of the switch is to ensure reliable messaging with acknowledgement packets 900 until it is certain that both the TVRex server 100 and the user hardware platform 101 agrees which game is being played. This thread is not a real time thread became it is a loop algorithm whose termination is indeterminate.

The game server threads T4 and T5 listen to the game applications to send information from the separate game applications to the user's or the system. The threads are designed in the Windows NT™ operating code such that the game application software is independent of the operating system core such that the game applications can be compiled, linked and added to the system without linking them to the core of the system. In this regard, the TVRex operating system operates similar to a standard operating system in which the game application software is run as a process. The game application software runs as a layer over the operating system and is restricted from accessing privileged instructions or low level control of the system Since the game applications need to communicate with the users and the operating system, the TVRex operating system provides communications services via threads T4 and T5.

Data received by the game process from the user is handled through thread T1, as described above. This data is sent via dedicated pipes from the T1 thread directly to the game process. Control information sent from a game process to a user or to the operating system is handled by the T4 thread which is shown in Table 2 as the Game Server (DLL) Control Mailslot. T4 serves all the games or game processes through a mailslot technique. Thread T4 is event driven which means it sleeps unless something has been placed in a game or process mailslot. There is one control mailslot and one broadcast mailslot. Thread T4 is not a real time thread and is not very busy since there are not many control packets generated. An example of a control packet would be to request termination of the process since there are no active users.

Data packets 900 sent from the game process to the users is sent via a broadcast mailslot idled by thread T5. Thread T5 is shown in Table 2 as the Game Server Broadcast Mailslot. Like thread T4, each game can send data mailslot to the game server in thread T5. Each game is capable of sending data to the Broadcast Mailslot 308 in order to append requests to the mailslot and each game receives or reads the answers from the users through its own pipe (handled by thread T1). Thus, there is one pipe per game process and only one broadcast mail slot 308 for all game processes. The TVRex server 100 handles the game process mail slot through thread T5 in reading data to be sent to the user, and the TVRex server 100 writes data from the user intended for a particular game process one of the pipes through thread T1.

A mailslot is used to send data from the game process instead of using pipes since the polling of pipes is time consuming. Threads T4 and T5 are event driven meaning the threads sleep if there is no data to be sent, thereby eliminating the processor overhead of polling pipes. Most of the time thread T4 and T5 sleep.

System Threads and Game Processes

The game processes are part of the multiprocessing environment but are not implemented as threads. Each game application is a context switched process in the multiprocessing environment of the TVRex operating system. By way of background, a process differs from a thread in that context switching between processes requires replacing the data segment, and the processor state (instruction pointers, register values, "stuck" resources, etc.). In contrast to this, context switching between threads does not require the replacement of the data segment: only the processor state. Context switching of threads is also known as a "lightweight processes" since the switching is quite fast and so quite suitable for real time applications such as in the present invention.

Figure 3:
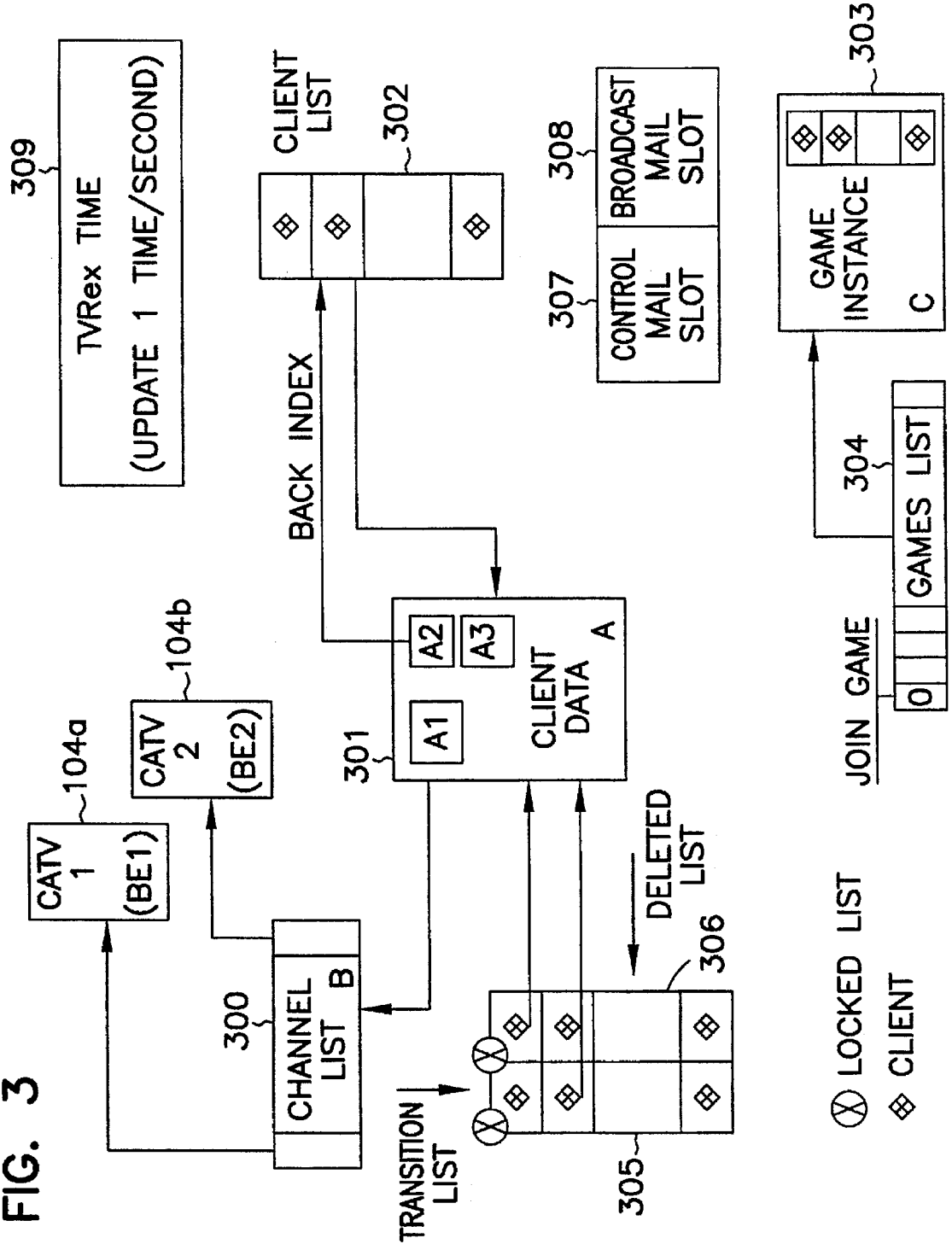
FIG. 3 is a block diagram of the data structures and their relative connections used by the multiple threads of the control software of the real time operating system.

The multiple threads of the present invention share much of the same data as shown in FIG. 3 so that a multi-thread operation is the preferred method of handling the communications control. The game processes are not multi-threaded even if the same game is being played twice since two distinct sets of users will be in different phases of completion of the game and hence the two game processes will have vastly different data sets. The game server hardware platform in the preferred embodiment contains sufficient main memory to allow the maintenance of all the game processes in main memory so that context switching between game processes is relatively fast. There should be no unloading of game processes to secondary storage between context switches.

Data Structures

Figure 5:
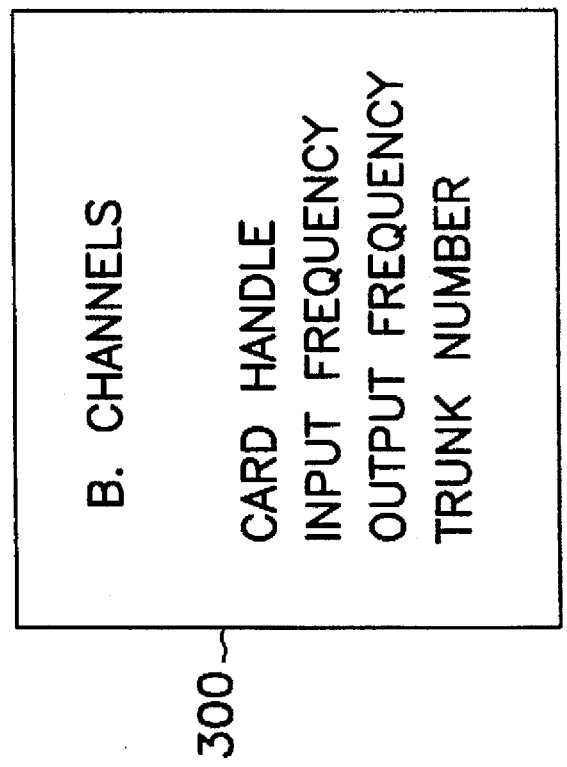
FIG. 5 is a block diagram of the Channels data structure of label b of FIG. 3.

Referring to FIG. 3, the data structures of the threads of Table 2 are shown diagrammatically. All threads shown in Table 2 access the data structures of FIG. 3. The TVRex server 100 contains an array of communications channels (frequency pairs) 102 each handled by a single BE communications card 104. The status and operating information of each BE card 104 (also known as a CATV card) is kept in the channel list or "B" data structure 300, which is shown in more detail in FIG. 5. Such information as the current operating uplink/downlink frequencies, the trunk number assigned to this card, the transmission rate, etc. is described for each BE card as an entry in the channel list array 300.

Figure 4:
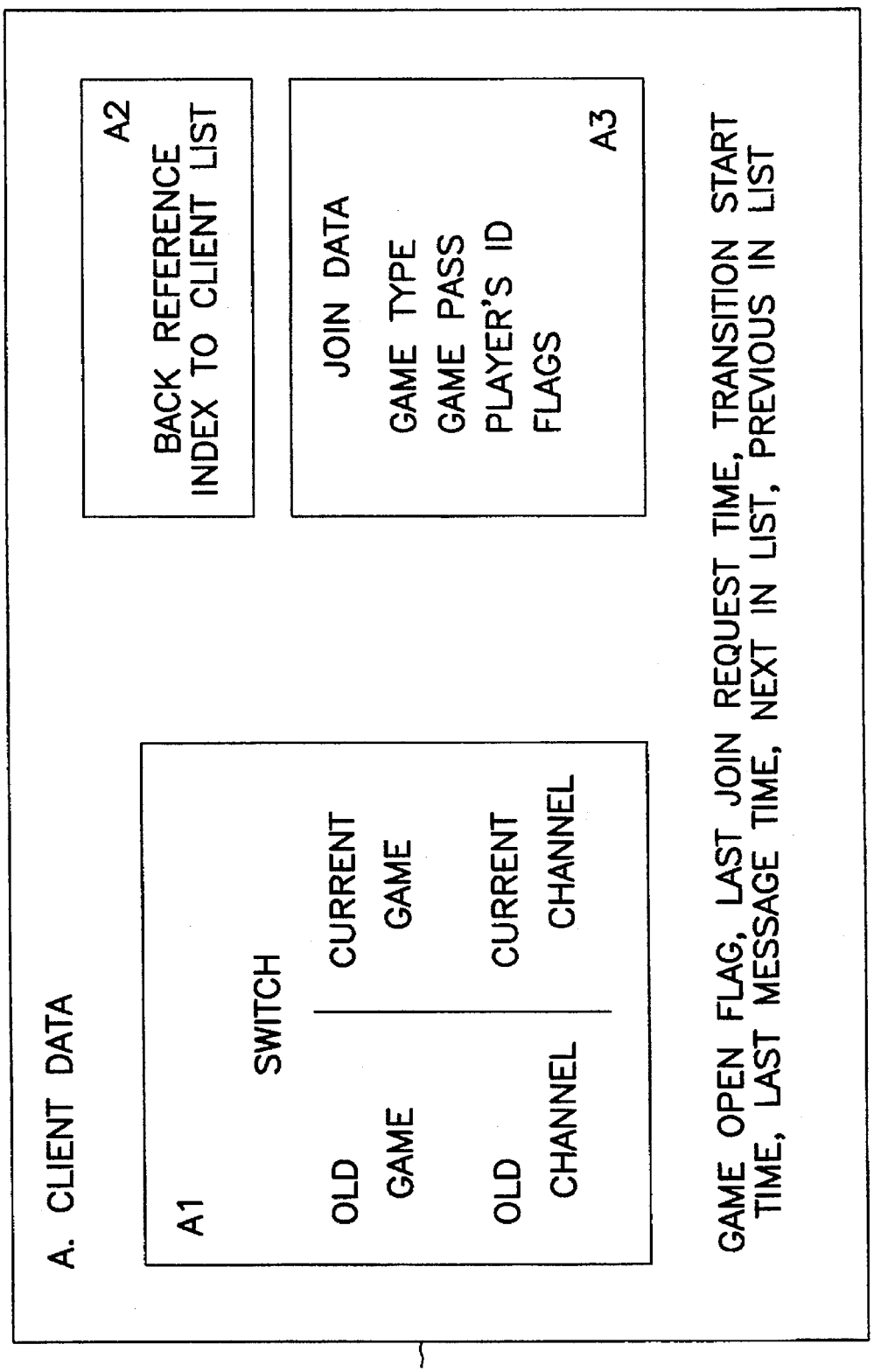
FIG. 4 is a block diagram of the Client data structure of label A of FIG. 3.

The Client Data or "A" data structure 301 is shown in FIG. 3, and is shown in more detail in FIG. 4. The Switch List data structure "A1", the back reference index to the client list "A2" and the Join Data "A3" is also shown in more detail in FIG. 4. The client number or client identity is the serial number of the FE card 105 attached to a specific user hardware platform. The client is distinguished from a game player since multiple game players such as member of the same family may use the same user hardware platform. Hence, there may be multiple game players in a single household all sharing a single user hardware platform 101. The purpose of the client list is to provide a central set of information about each client (user hardware platform) including status, game membership, game type, etc.

The switch data of the client data 301 of FIG. 4 refers to the transition of the client from one game to another. Thus, the old game and old game data is maintained during the transition along with the current game and current channel. Other data, such as the join data and other related flags are maintained for each client data record.

The use of the Client Data Structure 301 is best shown by way of example. In a communications transaction, a message packet 900 may come from a client numbered 17 and may be intended for game number 3. The TVRex system must verify that the communication is proper and not the result of a network mumble or noise corruption of the packet 900. The TVRex system will therefor attempt to first ensure that client 17 does exist, and then verify that client 17 is indeed in game 3 before the server delivers the message packet 900 to game process number 3. This verification process must be accomplished quickly and direct indexing may not be compute efficient enough for a real time operating system. Thus, in the preferred embodiment of the present invention, the clients array 301 is a B+ tree data base structure. This structure was chosen such that location of specific data is time bounded logarithmically. Each client data entry on the client data structure is pointed to from the client list 302, which enables the other data structures to link the client list efficiently.

Figure 6:
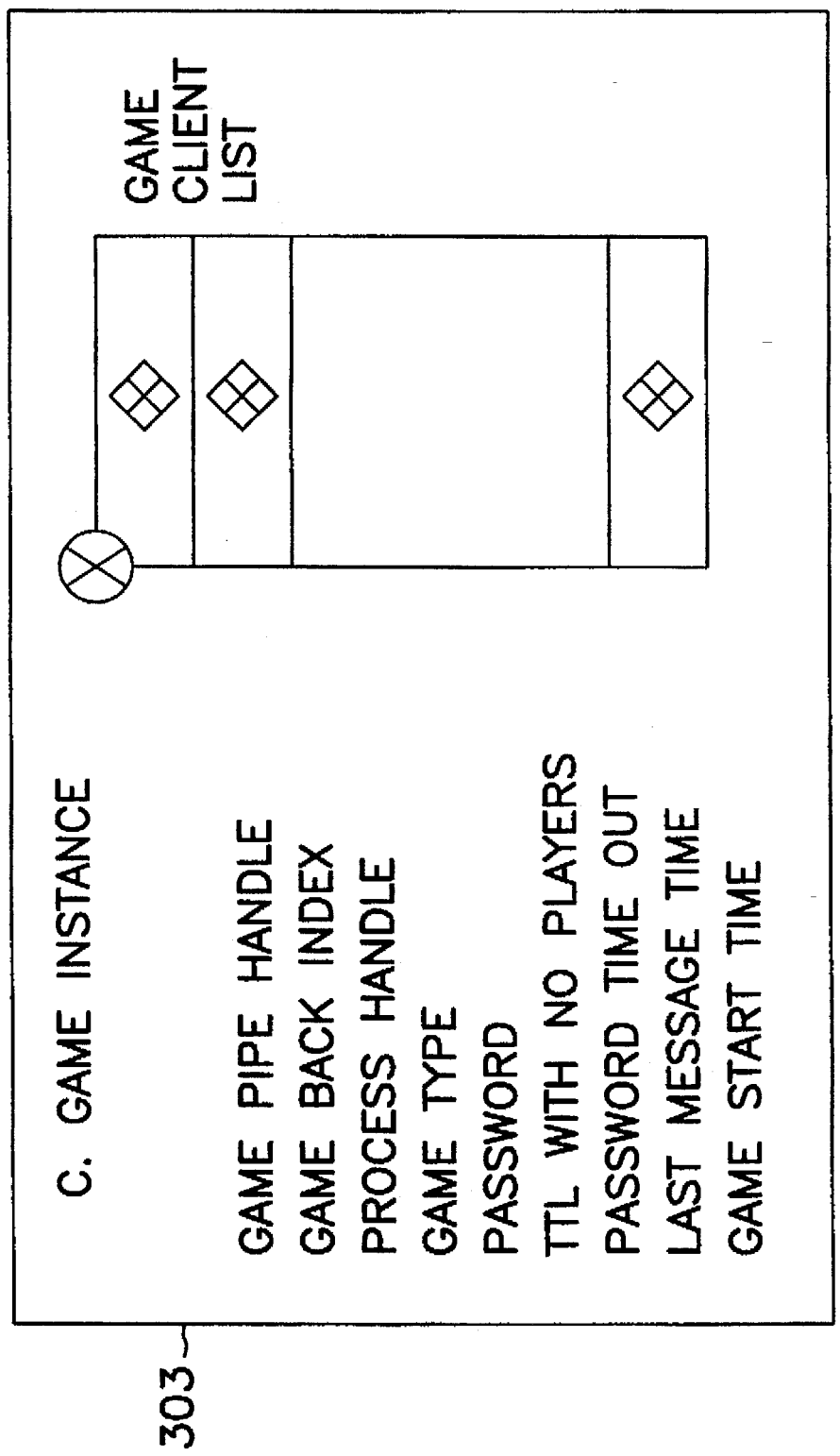
FIG. 6 is a block diagram of the Game Instance data structure of label C of FIG. 3.

The Games List 304 of FIG. 3 contains a list of all active games on the TVRex system. The Game Instance data structure "C" of FIG. 3 is shown in more detail in FIG. 6. Each entry in the Game List 304 corresponds to an active game process and has a structure shown in FIG. 6 as a Game Instance 303. The game pipe handle is a link to the process to enable communication from thread T1 to the game process. The game pipe handle is an opaque data structure to enable access to the game data structures. The game back index is a back index into the clients list 302 which monitors which clients are playing this particular game. The game channels which are involved in the game are also kept in the Game Instance data structure 303. Since most games played in this system are to be written by third party developers, close control of these processes is required to protect the operating system. Thus much of the data in the Game Instance data structure 303 is to allow the operating system to track the communications to ensure illegal operations and illegal communications do not take place.

Also found in the Game Instance data structure "C" of FIG. 3 is the game type which is an arbitrary number assigned to a particular game. This number is assigned by the owner of the TVRex system and given to the game developers so that close correspondence between the TVRex server and the user hardware platform and software is ensured. For example, the game type assigned to a particular football game requires that only the same game type of software be run at both the user site and the server site. The user site hardware platform may be a personal computer (such as an IBM-type PC, an Apple-type computer, Amiga, etc), a game console (such as Nintendo®, Sega®, Atari®, etc.) or a special set-top terminal.

The "TTL with no players" of the Game Instance data structure 303 refers to the Time To Life (TTL) for a game with no players actively engaged. It is efficient in a robust and active cable network to maintain a game in main memory, even though the game may have lost all users. This is because new users may join the game at any moment. The TTL function would set a time limit as to how long an inactive game is maintained. Other information in the Game Instance data structure "C" of FIG. 3 may include time stamps.

Game Password

Of particular importance in the present invention is the game password found in the Game Instance data structure 303. The game password enables a group of users to join a particular game by nature of their common knowledge of the game password. A user may communicate to the cable headend that he or she wishes to reserve a particular game to be played only by their friends. The user may assign a password known only to the group of friends enabling all the holders of that password to join a private game. In this fashion, reserving a game on the cable network would be much like reserving a table in the restaurant. The later arriving guests need only know under which name the table was reserved. In a similar fashion, the later arriving game players in the present invention can join a game reserved only for their circle of friends.

The game password is an important feature of the present invention since without it the subscribers to the network would be always placed with an unknown group of other cable subscribers. The random placement of user's into games may not be desired by some users since they may prefer playing the games only with acquaintances. The game password enables the user to select either a random placement into a particular game or a selected placement. This becomes increasingly important depending upon the game type. For example, users may wish to play bridge with only certain partners. The user may preselect the password, or the user may choose not to supply the game password and therefore be placed in a game by chance. In the case of a preselected password, the server may want the game password to time out or expire after a present period of time to open the game up to the public. In this fashion, the password time out field of the Game Instance data structure 303 may be used.

Transition/Deleted Lists

The transition list 305 and the deleted list 306 are used by the T3 Switch thread of Table 2 to manage the transition of clients to and from games even though the communications medium is unreliable and therefore information regarding the transitions may be lost. The transition list 305 is a linked list to the client list 301 to describe clients which are in the middle of transitions from one game to another, from no game to a game or from a game to no game. The members of the transition list 305 are kept long enough for the TVRex system to ensure that both the server and the user have confirm the transition. Pending confirmation, the client list contains information regarding the transition. Once the transition is complete and verified, the client is taken off the list. In FIG. 3, the diamond symbol indicates a link to the client list and the circle with an X in it indicates a locked list.

After confirmation that both the user side and the server side recognize the transition, the client is moved from the transition list 305 to the deleted list 306. The need to still maintain the client name in the deleted list 306 is related to the fact that a multi-threaded operations are active. Because the operations in the present system include multi-threaded and multi-processing operations which may happen concurrently or parallely, the system must ensure that the concurrent or parallel operation not miss the change in status of a client. Became the present system is a real time operating system, the system cannot use traditional locking mechanisms of the transition list since the locks may came the operating system to loose its deterministic quality due to an excessive number of locks and the fact the release of a lock is indeterminate. To avoid the use of locks on the transition list 305, a transition which has completed is placed in the deleted list 306 and the memory allocation is maintained, In this fashion, a null in the transition list will indicate that the client is in transition and the maintenance of the client in the deleted list for a second will ensure that the threads will not get lost looking for a client which is in transition.

Mail Slots

The control mail slot 307 and the broadcast mail slot 308 are the data spaces used by the T4 Game Server (DLL) Control Mailslot Thread and the T5 Game Server Broadcast Mailslot Thread, respectively. These data structures receives messages from the game processes for each game in the game list 304 and are used to pass message packets 900 of FIG. 9 to the users and to the TVRex operating system. The TVRex timer data space 309 is used by the Timer thread T2 to keep track of the timer operations in the system.

Software Flow Charts

The TVRex real time operating system software is described in detail in the flowcharts of FIGS. 11 through 15. The control flow diagrams of the operation and interaction of the system with the user hardware platform is shown in FIGS. 16A–C. The flow charts describe the operation of the threads T1–T5 and are drawn in a fashion which describe high level operation. Became these flow charts describe real time operating system threads, they do not necessarily show a termination point or exit point. The exit point on these flow charts is anywhere the process completes at a square instruction box.

T1 Dispatcher Thread

Figure 11:
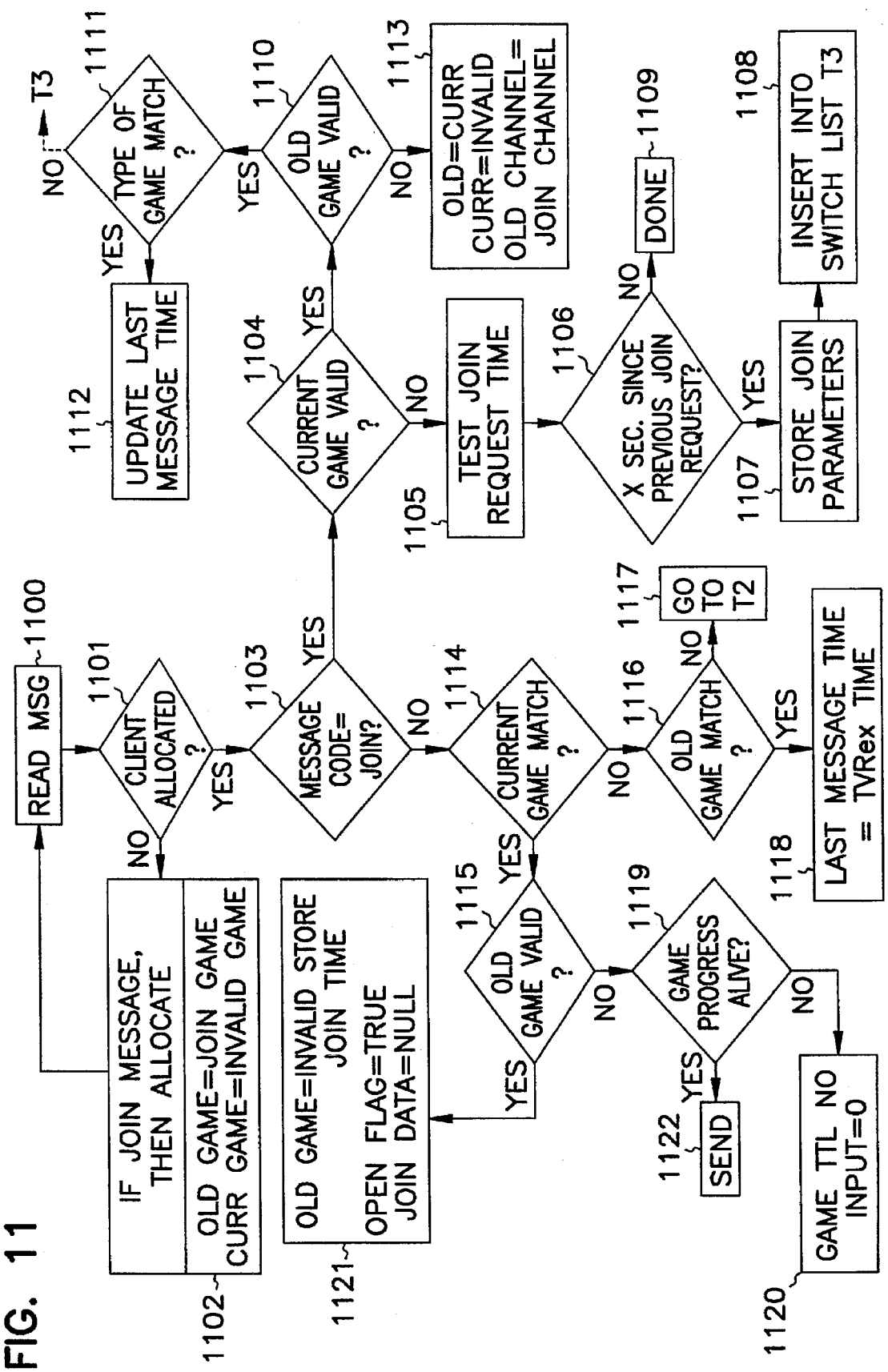
FIG. 11 is a software flow chart for the T1 processing thread of the dispatcher algorithm which receives and processes the data packets of FIG. 9 from the users.

FIG. 11 is a software flow chart for the T1 processing thread of the dispatcher algorithm which receives and processes the data packets 900 of FIG. 9. The T1 thread is the highest priority thread and must complete its tasks in a bounded pealed of time to ensure real-time operation. There is a T1 thread for each BE card 104 attached to the TVRex server. The control flow of the T1 thread has been designed to maximize efficiency in handling the data packets 900 of FIG. 9 in the least amount of time. The T1 thread "sleeps" until the BE communications card 104 indicates a packet 900 has been received. The receipt of the packet 900 is the event which "wakes" the T1 thread to process the packet 900. The use of a separate dispatcher thread T1 to receive packets from the user and a broadcast thread T5 to send packets to the user allows the threads to independently release the CPU. If a single thread handles both input and output, one of the two could swamp the CPU and starve the other and the CPU would never be released. The independence of the two allows a regular releases of the CPU.

The T1 process thread of FIG. 11 has been carefully designed to handle corrupted packets 900 since the communications medium is inherently noisy and the likelihood of receiving a corrupted packet 900 is relatively high. Therefore, all the decision continually check to see if an illogical request is being made. Illogical requests could be as the result of the user 101 not receiving the last packet so that its request is invalid, or it could be the result of the server 100 not receiving an earlier packet from the user. In addition, since the communications medium is assumed to be unreliable, both the server 100 and the user equipment 101 are designed to be persistent in their attempt to communicate. Therefore, both sides of the communications channel repeatedly send redundant requests until the other side acknowledges the requests.

In FIG. 11, thread T1 is awakened by the receipt 1100 of a packet 900. The first decision 1101 to make in analyzing the packet 900 is to see if the client indicated in the packet 900 has been allocated. If not, control is passed to box 1102 to determine if this is a join request. If not a join request and the client has not been allocated, then the packet is ignored and the process returns to read the next packet at 1100 or to sleep. If the packet is a join request at 1102, then the client is allocated to the client list, the "old game" indicator is set to a join and the "current game" indicator is set to an invalid game. With these flags set, the T1 dispatcher thread will process the join request the next time the user sends a join request. The user is persistent in its attempt to join the system so the T1 thread is assured that the user will request again.

The join request is handled in multiple passes through the T1 thread so as to not tie up the resources of the T1 dispatcher thread and therefor free the T1 thread to handle other requests. The join operation to allocate a user in this pass through the loop has taken up as much time as is allowed for a single pass through the T1 thread. After the client is allocated, the thread is terminated and the rest of the information in the packet is lost after the flags are set so as to keep the response time of the T1 thread bounded.

The second time the join packet is received by the T1 thread, the answer as to whether the client is allocated will be hue and control is passed from decision box 1101 to decision box 1103. The join packet should contain a join message code which will pass control to decision box 1104 to query whether the "current game" variable has a valid game number. If the current game variable is set to "invalid", control will be passed to operation box 1105 which tests the join request time. If the join request was more than x seconds ago at decisions box 1106, then the T1 thread stores the join parameters in the data structures of FIG. 3 at box 1107 and the user is placed in the switch list or transition list 305 at box 1108 to be handled later by the switch thread T3. If the last join request was made too early (the variable x is set to minimize the effects of loading and traffic on the T1 thread), the system rejects the join request so that it is handled later and the thread terminates at 1109.

If the current game variable is set to a valid game, control is passed from decision box 1104 to decision box 1110 where the old game variable is tested to determine if a game switch is in progress. If the old game is valid at decision box 1110, then control is passed to decision box 1111 where the type of game is tested to determine if the user wants to join the game that he just left. If the type of game matches at 1111, control is passed to box 1112 where the last message time variable is updated so the timer thread T2 is informed that this user is still responding and is active. If the type of game does not match, then the user is put into the switch list and the T1 thread terminates. The user will then be later handled by the T3 switch thread, described more fully below.

If the decision at box 1110 indicates that the old game variable is set to invalid, then the user must be attempting to switch games. In this case, control is passed to box 1113 and the "old game" variable is set to the "current game" variable, the current game variable is set to invalid (a switch is in progress) and the old channel is set to the join channel. The user is placed in the switch list and the T1 thread terminates.

The testing of packets for valid information at multiple places in the T1 thread is to filter bad packets and to maintain discipline on an unreliable communications path.

If the message packet 900 was not a join request at decision box 1103, then the packet is tested for valid game indicators and is routed. At this point the flowcharts for the T1 Dispatcher should be viewed in conjunction with the T3 switch thread to best understand the operation and interaction of the T1 and T3 threads. To explain the operation of the T1 and T3 threads, a game switch example is useful. If a user wishes to switch from one game to another game, the system must change a number of parameters such as the communication frequency pair, the front end application software (at the user hardware platform) and the back end application software (at the server). So handshaking between the TVRex 100 and the user hardware platform 101 must occur to change the parameters. In the case of changing frequency, the FE card 101a must first transmit the requests on the old frequency used by the old game and get an acknowledgement on the old frequency before the frequency switch can be made. This must be done in spite of the unreliable communication network. This is accomplished by handshaking on the old frequency, moving to the new frequency and handshaking on the new frequency. In this regard, the TVRex must keep an old game context and a new game context until the move is complete.

Referring once again to FIG. 11, if the current game matches between the TVRex stored parameters for this client and the current game in the packet 900, as described in decision box 1114, control flow is passed to decision box 1115. At this point, the T1 thread asks if the old game is valid at 1115 to determine if this is the first new message coming in on the new frequency pair (or channel) after switching. In this situation, there is an old game and a new game which are valid since the user is straddling frequency channels. If decision box 1115 is true, then the switch has not yet been completed from the old game to the new game and control is passed to box 1121 where the parameters are updated. The "old game" variable is set to be invalid, the join time (for billing purposes) is set, and the join data is set to null since the join is compete for the switch.

If the old game was found to be invalid at decision box 1115, then the control flow is passed to decision box 1119 to determine if this packet is to be passed to an operating game process. Because there may be an error due to network unreliability, control flow may pass from box 1119 to 1120. For example, at box 1119, the user may have sent the wrong data due to a failure in communication. If the old game does not match and the game process is invalid or not alive, then the packet is viewed as invalid and equivalent to a no-response situation.

Figure 13:
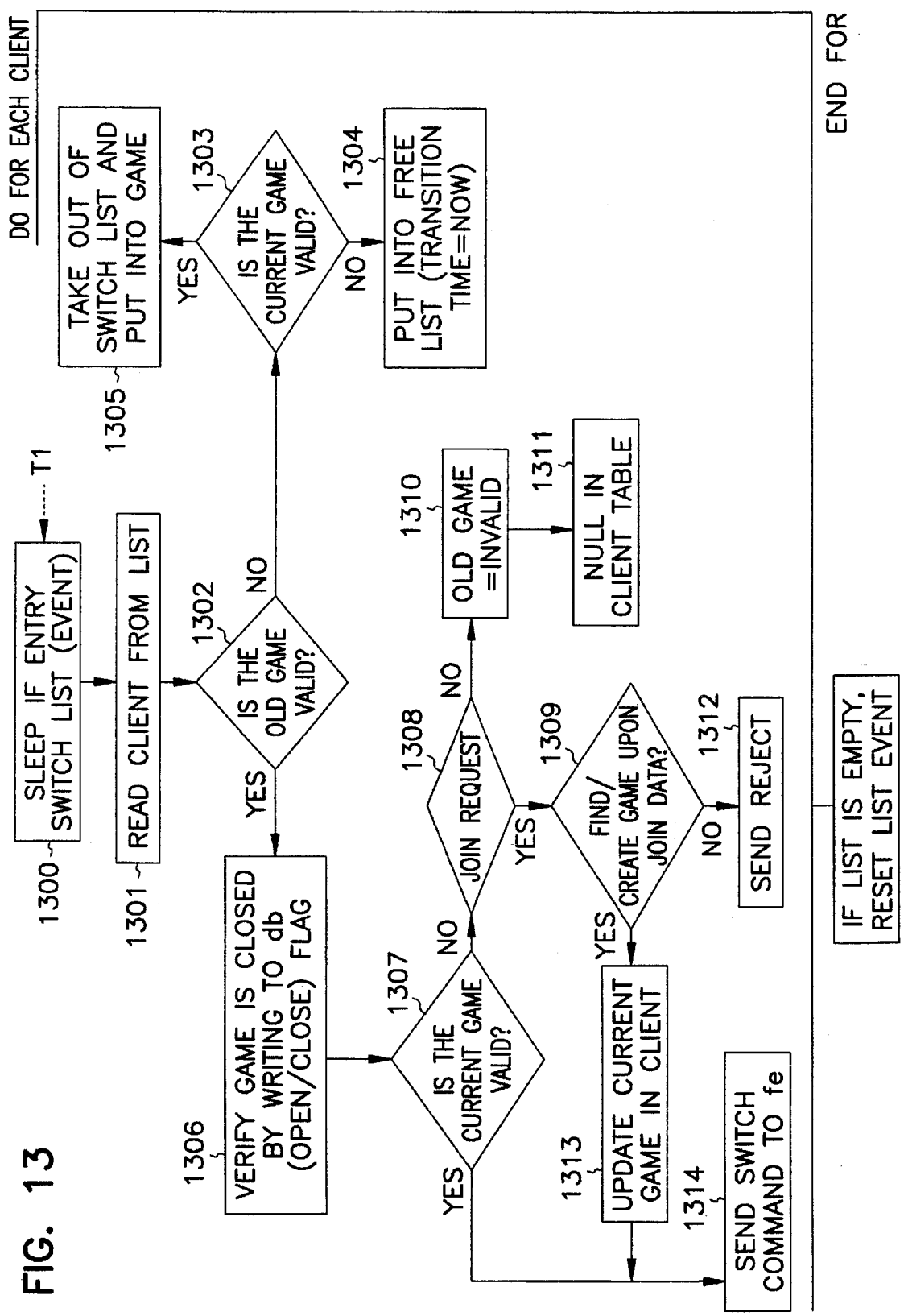
FIG. 13 is a software flow chart for the T3 switch algorithm processing thread which receives and processes the data packets of FIG. 9 to determine the change in status of games and users.

Referring to FIG. 13, the T3 Switch Thread sleeps until an entry is placed in the switch list or transition list 305 at box 1300. If an entry is placed in the transition list, the T3 thread reads the client name from the list at 1301 and checks to see if the old game is valid at 1302. If the old game is not valid, a switch must be partially completed so control flow is passed to decision box 1303 which asks if the current game is valid. If the current game is invalid, then the user has completed a transition to a no-game situation and the user is leaving the system at box 1304. The client is placed on the free list, also known as the deleted list 306, at box 1304 and the system prepares to remove this client. If the current game is valid at 1303, then the transition for the client from one game process to another has been completed and the user is removed from the switch list 305.

Referring once again to the decision at 1302, if the old game is valid, a transition has not yet been completed so control is passed to box 1306 to verify that the old game has been closed for this user. Control is then passed to decision box 1307 which asks if the current game is valid. If the current game is not valid, then the packet must represent a join request so control is passed to decision box 1308. If this is not a join request, then this packet must represent the dosing out of the user from the game without specifying the new game. Control is passed to box 1310 to set the old game variable to invalid and to place a null in the client table at 1311 to dose out this client (including dosing of the billing period). In the present system, the billing for the use of a game is only made when a user successfully completes a particular game. If the game terminates improperly, the user is not billed.

If this packet represents a valid join request at decision box 1308, then a join request is mandated and control is passed to decision box 1309 to locate the requested game. If no game is found corresponding to the requested game, a rejection message is returned to the user at 1312 and the thread loops to the start again to service any more entries in the switch list. If the game is found at 1309, control is passed to box 1313 where the current game number is loaded with the requested game number and an acknowledgement of a completed switch is sent to the FE cards 105 to acknowledge the switch at 1314.

T2 Timer Thread

Figure 12A:
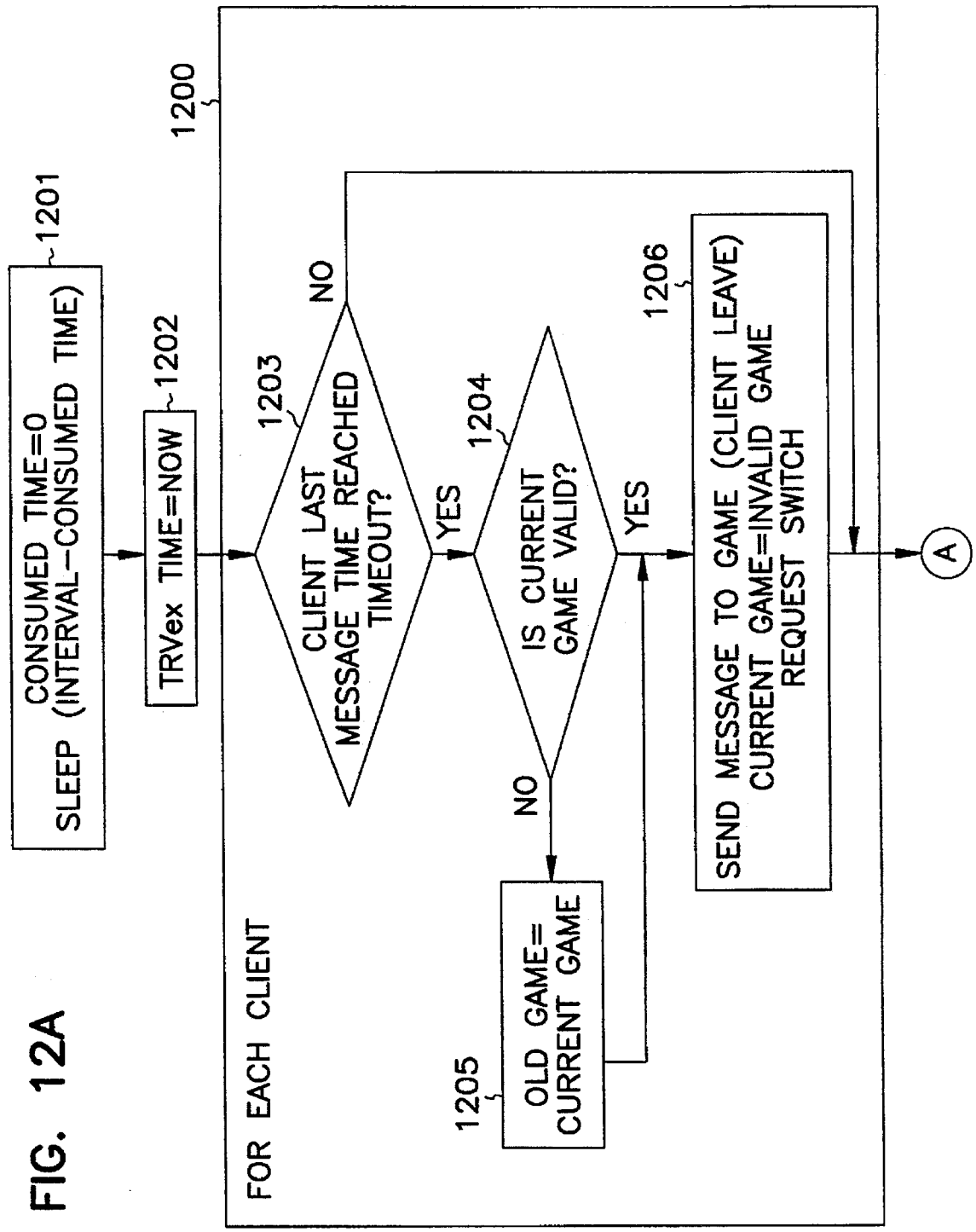
FIGS. 12A, 12B and 12C are software flow chart for the T2 processing thread of the timer algorithm which to determine the timeout of events.
Figure 12B:
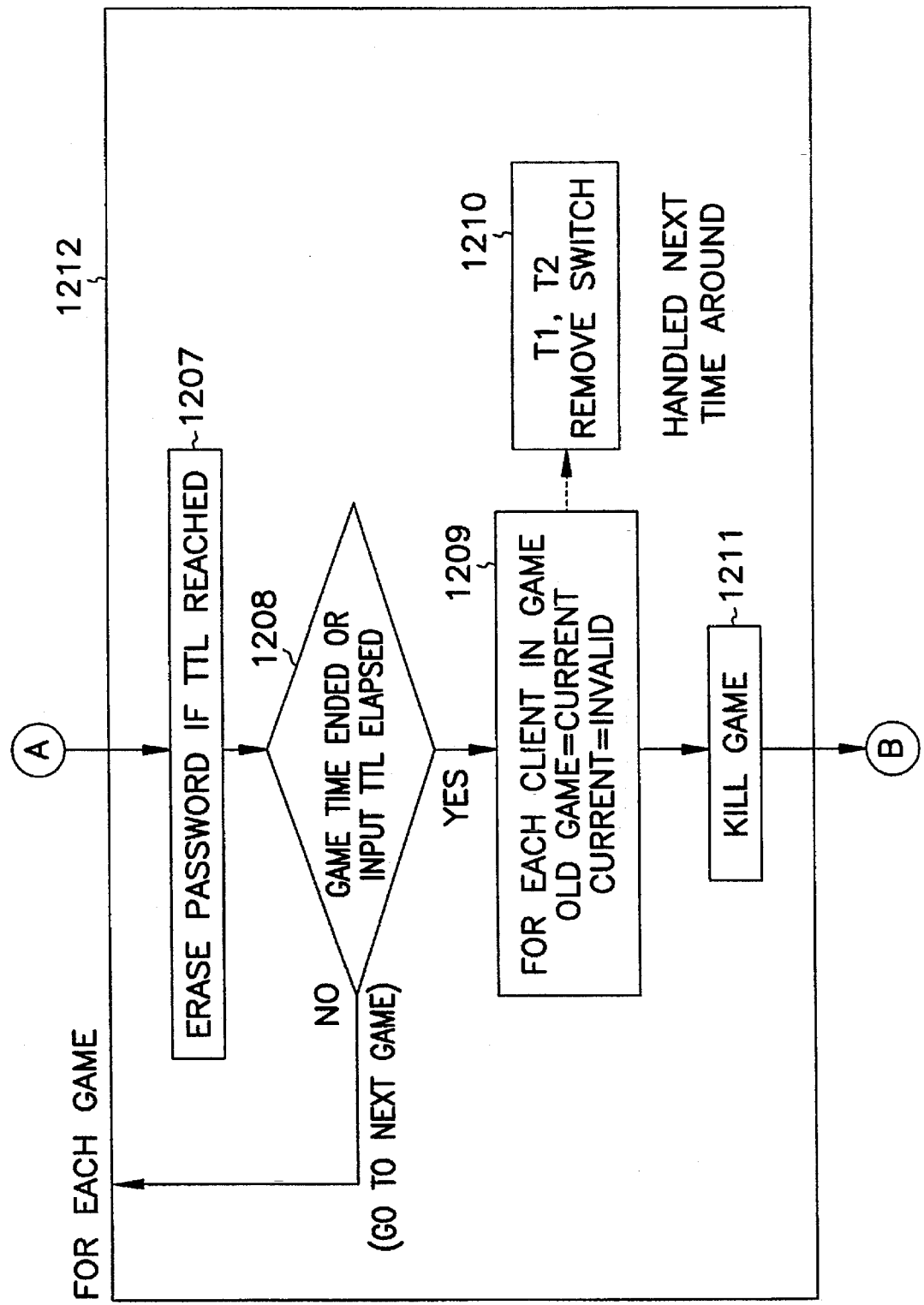
Figure 12C:
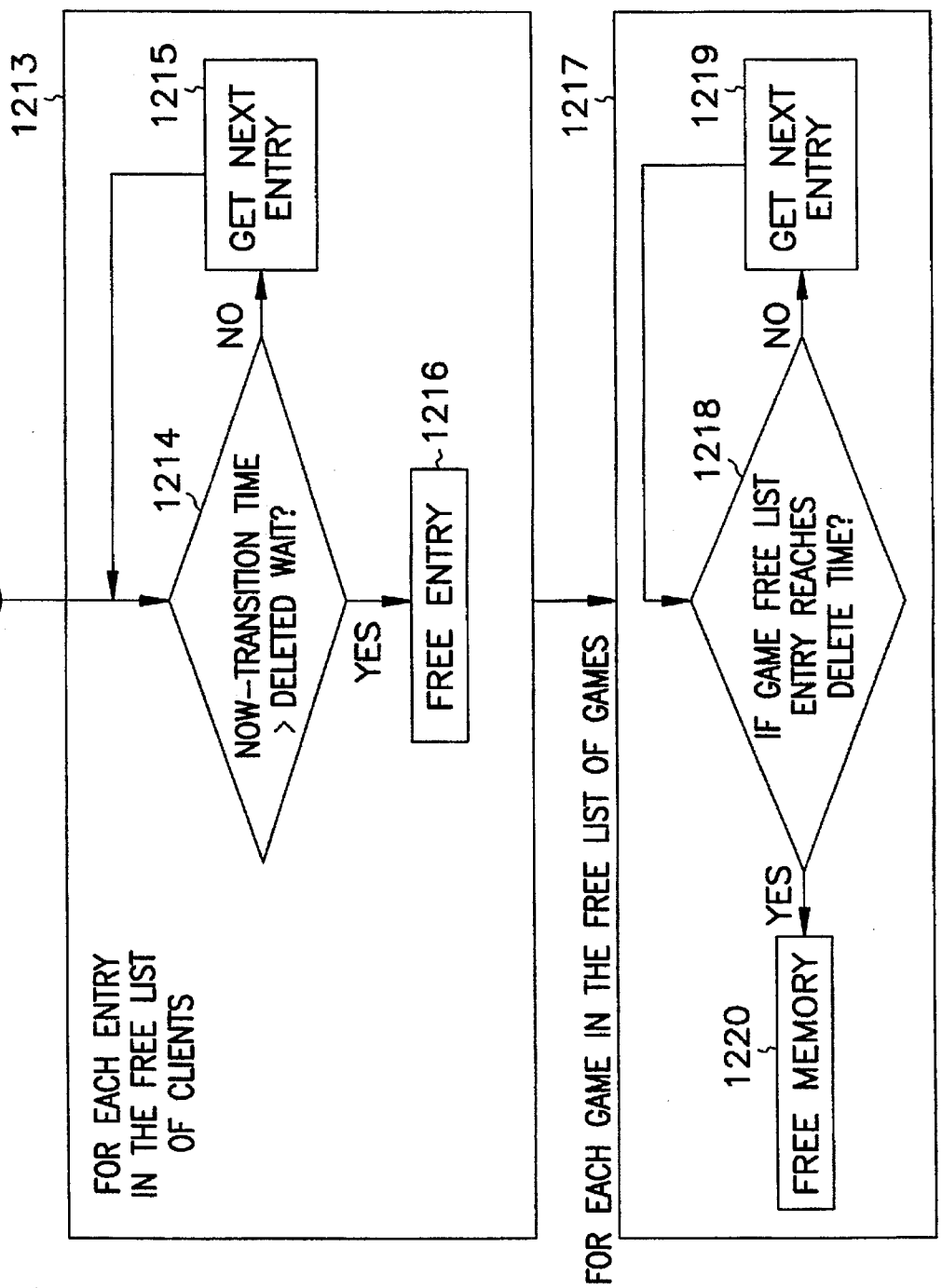

FIGS. 12A, 12B and 12C are software flow charts for the T2 processing thread of the timer algorithm which determines the timeout of events. The timer thread is a low resolution timer so that not much CPU resources are consumed in keeping track since only the resolution of seconds is needed. Every time the timer thread awakens (by a system interrupt), the consumed time variable is set to zero and the time to next waking is determined by subtracting the time consumed during this waking period from the present interval time at box 1201. The interval between waking is typically desired to be one second. The current time is also recorded for use by the system at 1202, for example, in timing the duration of a user playing a game.

Referring to FIG. 12A, the major loop 1200 operates for every client or user of the system. The activity of every user is monitored and if a client or user is inactive for a preset period of time (different for every game), the client/user will be purged from the system as a time out situation. Of course users may pause their games for a preset period of time but the system desires to rid itself of inactive users who are consuming system resources. Thus for every client in the system, the question of decision box 1203 is asked to determine a time out situation. If a timeout situation for a user is reached, the timer thread T2 checks to see if the user's current game is valid at decision box 1204. If the current game is not valid, then the old game is set to be the same as the current game at box 1205 and the timer will purge the user through the T3 switch thread. If the current game is valid, a message is sent to the game that this client must leave the game and the current game is set to be invalid at box 1206 and the T3 switch thread will purge the user by having the user placed in the transition or switch list.

FIG. 12B describes a major loop 1212 for every game. As described above, a password may be assigned to a game to allow only a private group of players to join. Abuse of the password system must be avoided so the T2 Timer Thread is used to time out the use of a password. A user may assign a password to a game but the system wants to erase the passwords to prevent a user from reserving too many games or for reserving a game for too long. The password is then erased at box 1207 if the TTL (time to life) is reached.

The T2 Timer Thread can handle the closing out of the game itself if the game has an expiration period. For example, in the case of a game operating as a polling mechanism to obtain votes from cable subscribers on various topics, the game may have a Time To Life (TTL) function which may terminate the process at a preset time. The T2 Timer Thread will purge all users from the game when TTL is reached. Thus, at decision box 1208, a game may have a finite life which, when expired, the game must be purged. If the game is expired or purged, the system must switch all the active players or users from that game to an inactive process (no game). So in the process of killing a game, each user is placed in the switch list to clean house and move all the users out using the T3 Switch Thread. At box 1209, all the users/clients/players of a game have their respective "old game" variables set to the current game, and the "current game" variables set to invalid. This will enable the Switch Thread to remove the users from the game (phantom box 1210) during the next time. The game itself is then killed at box 1211.

FIG. 12C describes a major loop 1213 for each entry in the free list of clients, also described as the deleted list 306 in FIG. 3. The deleted list is used to temporarily hold deleted clients for a period of time until all threads have had a chance to recognize that the transitions are complete. Thus the delete wait time is measured at decision box 1214 and the entry into the delete list 306 is freed at 1216. If the client has not sat in the deleted list long enough, control is passed to box 1215 to loop to the next entry in the deleted/free list 306.

Another major loop in the T2 Timer Thread is to determine if a game has no users and thus should be purged. If the game has no users or players, the game may still remain in memory in anticipation of a new user joining very shortly. After a period of time determined at 1218, the system may wish to purge the game at 1220 to free the memory. If the game has not been idle long enough, the loop 1217 gets the next entry in the game list at 1219 and tests the next game.

T3 Switch Thread

FIG. 13 is a software flow chart for the T3 processing thread of the switch algorithm which receives and processes the data packets of FIG. 9 to determine the change in status of games and users. The thread is context driven based upon entries in the switch list. The switch thread T3 changes clients from nothing to a game, from a game to another game or to a game to nothing. The T3 switch needs to verify the transition of the client through the transition list 305, the client list 302 and the game list 304. The T3 thread works at a very low rate. The thread wakes up every second or so to check the switch list to determine if there is something to be serviced. If the list is not empty, the switch list becomes active. The T3 thread of FIG. 13 is shown to have a major loop which runs until the switch list is empty.

The T3 switch thread of FIG. 13 should be viewed in conjunction with the T1 dispatcher thread of FIG. 11 and the T2 Timer thread of FIGS. 12A–C. Upon entering the thread at 1300, the entry in the switch list is examined. The client data is read from the client list 302 at box 1301 and the "old game" variable is examined at 1302 to determine if the old game is valid. The question of whether the old game is valid or not is important since a hook to the old game is needed to properly switch the game to the new game. In the case where the old game is invalid, the control is passed to decision box 1303 indicating that some previous actions by the T1 or T3 threads have partially completed a switch. At decision box 1303, the question is asked if the current game is valid so the switch can be completed If the new game is valid, then the client has successfully completed a switch to a new game and the client should be taken out of the switch list at box 1305. The client is then placed in the new game and the switch transaction is complete. If the current game is invalid, there is a problem with the switch and the client is put into the flee list (deleted list) 306 and the timer thread T2 will eventually lime out the user. Getting to box 1304 in the flowchart of FIG. 13 is an error condition probably due to corrupted packets 900.

A game is always considered open or closed for a particular user. A game status flag for each user will indicate whether the game is open or closed. The game flag is handled by two threads: the dispatcher T1 and the T3 switch thread, When the dispatcher thread T1 determines that a client has reached its destination (a game), the dispatcher opens the game so the open flag is set to true and the client has finished the switch. The time to close the game is in the T3 switch thread, If the old game is valid at decision box 1302, the T3 switch closes the old game at box 1306 and verifies that the game is closed by writing to the database. The closed flag for an old game completes the old game and doses the billing cycle for that game. The database records the time the game was opened for a particular user and the time that it was closed so the time the user spent in the game is billed at the hourly billing rate.

The next decision box at 1307 asks whether the current game is valid. If the current game is invalid, then this packet must represent a join request. The decision box 1308 determines if this is a valid join request. If this is not a valid join request, this packet is confused and control is passed to box 1310 where the old game is set to invalid and a null is placed in the client table at 1311. Thus, in future transmissions by this client, the old game will be invalid and the new game is invalid so the client will then time out if the join requests are not properly made in the future.

If this packet does represent a valid join request, at 1308, then the T3 thread must determine if the game requested is an active process. Thus at decision box 1309, the system examines whether it has found or been able to create the game based upon the join data. If no valid game is found or could not be loaded/created, control is passed to box 1312 where the join request is rejected. If the game is found or created, control is passed to box 1313 where the game data of the game to be joined is updated by adding this client to the game list. At this point, control is passed to box 1314 where the T3 thread sends a message back to the user's FE card to inform it of the successful switch. At decision box 1307, if the current game was valid, then the join request must have been completed in an earlier pass through the T1 and T3 threads so the switch was completed. Control is then passed to box 1314 for the action described previously for this box.

DLL Server Thread T4

Figure 14:
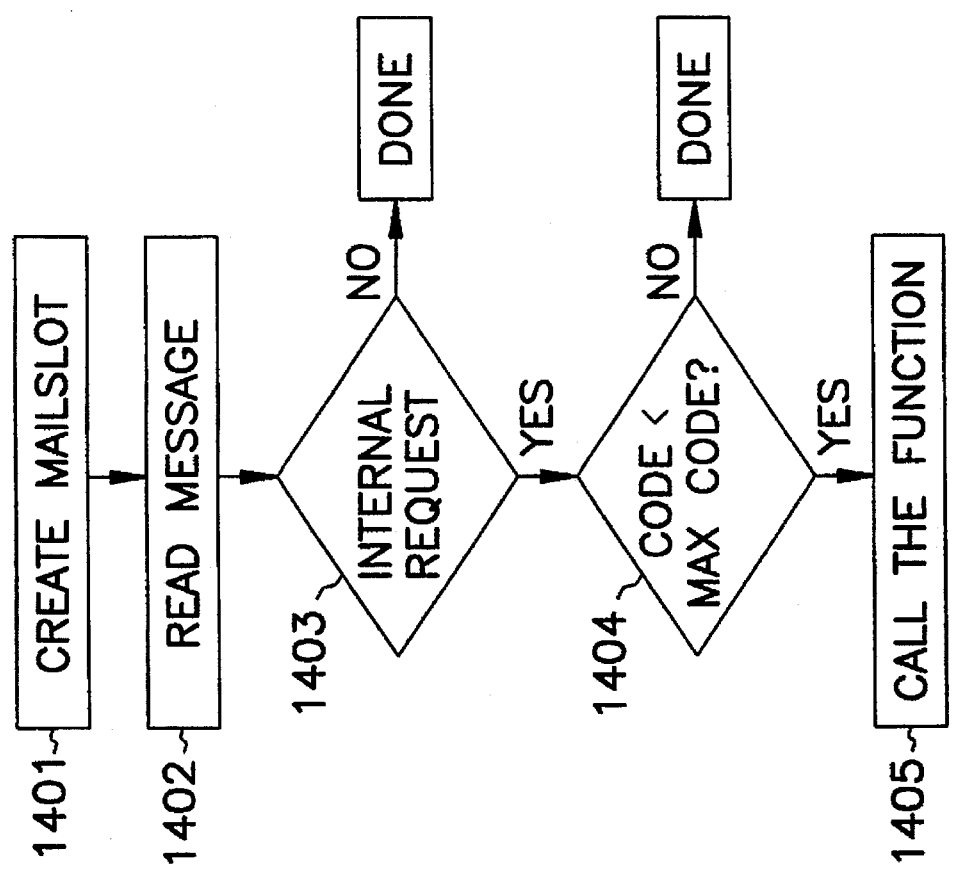
FIG. 14 is a software flow chart for the T4 DLL Server algorithm processing thread which passes control information from a specific game processes to a user or to the operating system via mailslots.

FIG. 14 is a software flow chart for the T4 DLL (Dynamic Linked Library) Server thread which scans the mailslot 307 for messages from the game processes and answers the requests through pipes dedicated to each process. This thread handles control information between the processes and the server operating system. The concept of using a mailslot and pipes is to separate the memory of the operating system and the game processes to protect the operating system from the sins of the processes. If a process fails (due to an invalid instruction, writing to protected memory, etc.) the operating system is protected since the process does not share any memory with the operating system.

The T4 DLL Server Thread acts as an interface between the game application programmer and the TVRex operating system. The interface consists of a library of function or function calls that the programmer can use to communicate with the TVRex operating system An example of these function calls are broadcast a message out, return the name of a client, terminate the game, accept another client, throw out the client, etc. These function calls are translated into messages, the messages are placed in the mailslot and the answer is returned to the application through a pipe.

In FIG. 14, if a game process is to send a request to TVRex operating system, the mailslot entry is created at 1401. The message found in the mailslot is read at 1402 and decoded. If the message is not an internal or system request, determined at decision box 1403, it is processed directly and the thread is done. If the message is an internal or system request, the control is passed to decision box 1404 where thee request code is checked to be in the proper range. If the request code is invalid (out of range or garbage due to a process gone bad), then the request is not processed. If the request code is valid, then the function is called and the request is serviced at 1405.

Broadcast Thread T5

Figure 15:
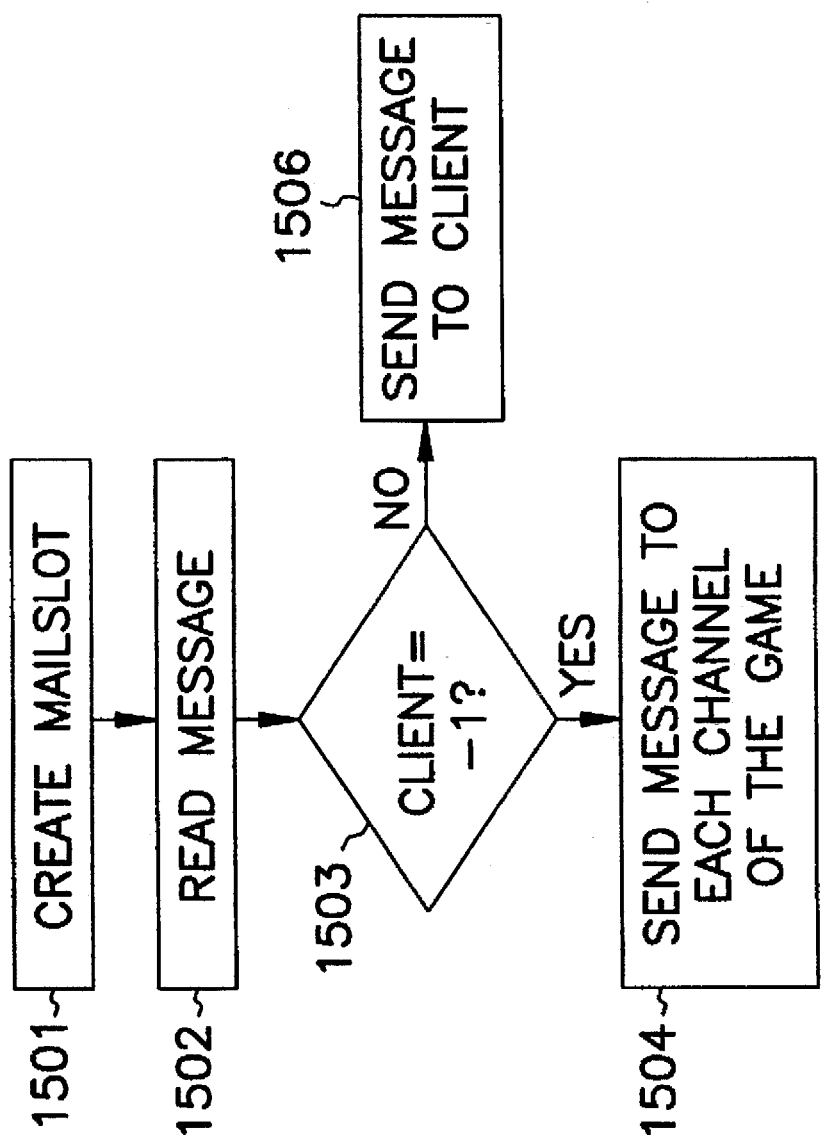
FIG. 15 is a software flow chart for the T5 Broadcast thread which passes data from specific game processes to users via mailslots.
Figure 16A:
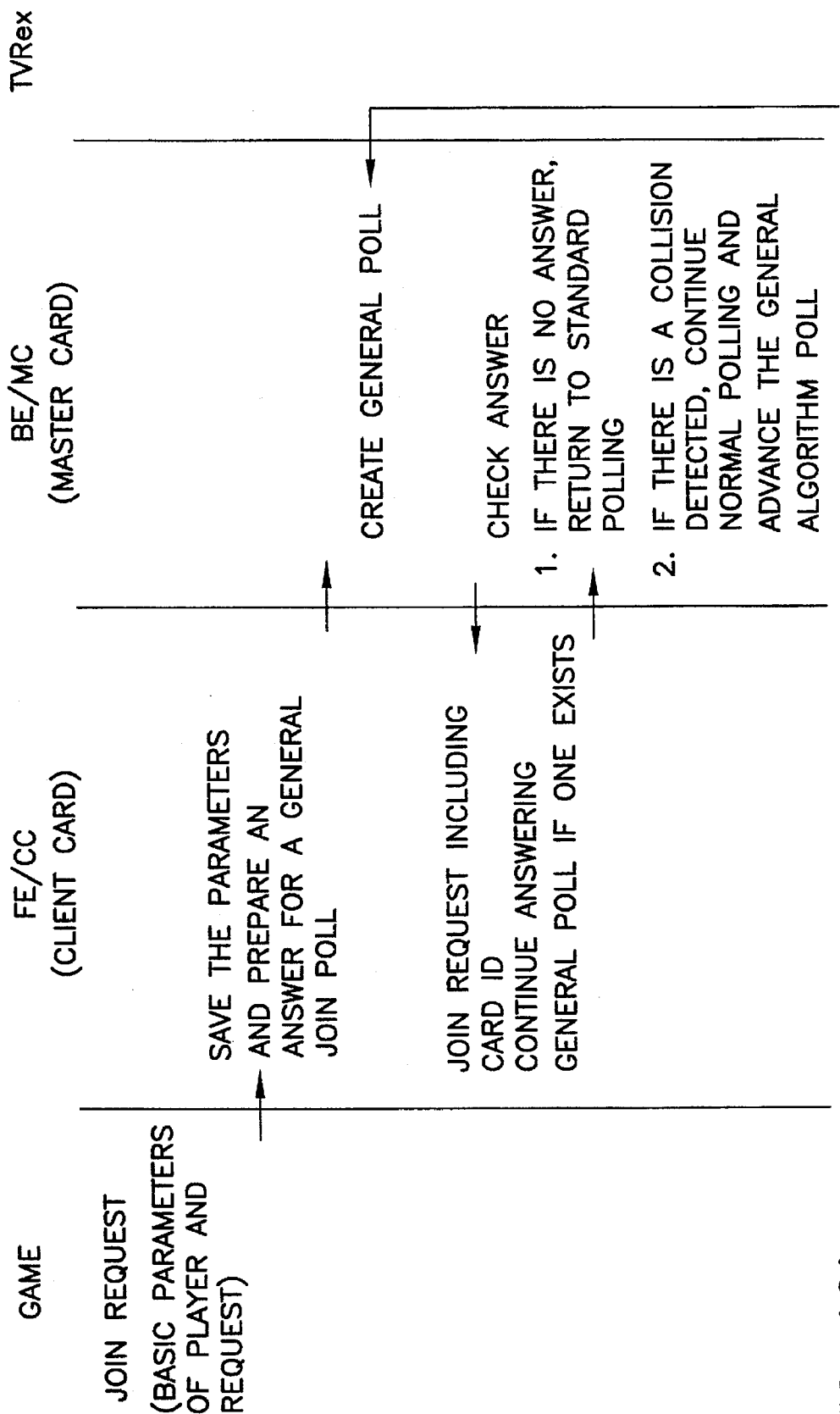
FIGS. 16A, 16B and 16C are control flow timing diagrams showing the communications and process flow between the users and the server to join, play, change and quit any number of a plurality of provided games
Figure 16B:
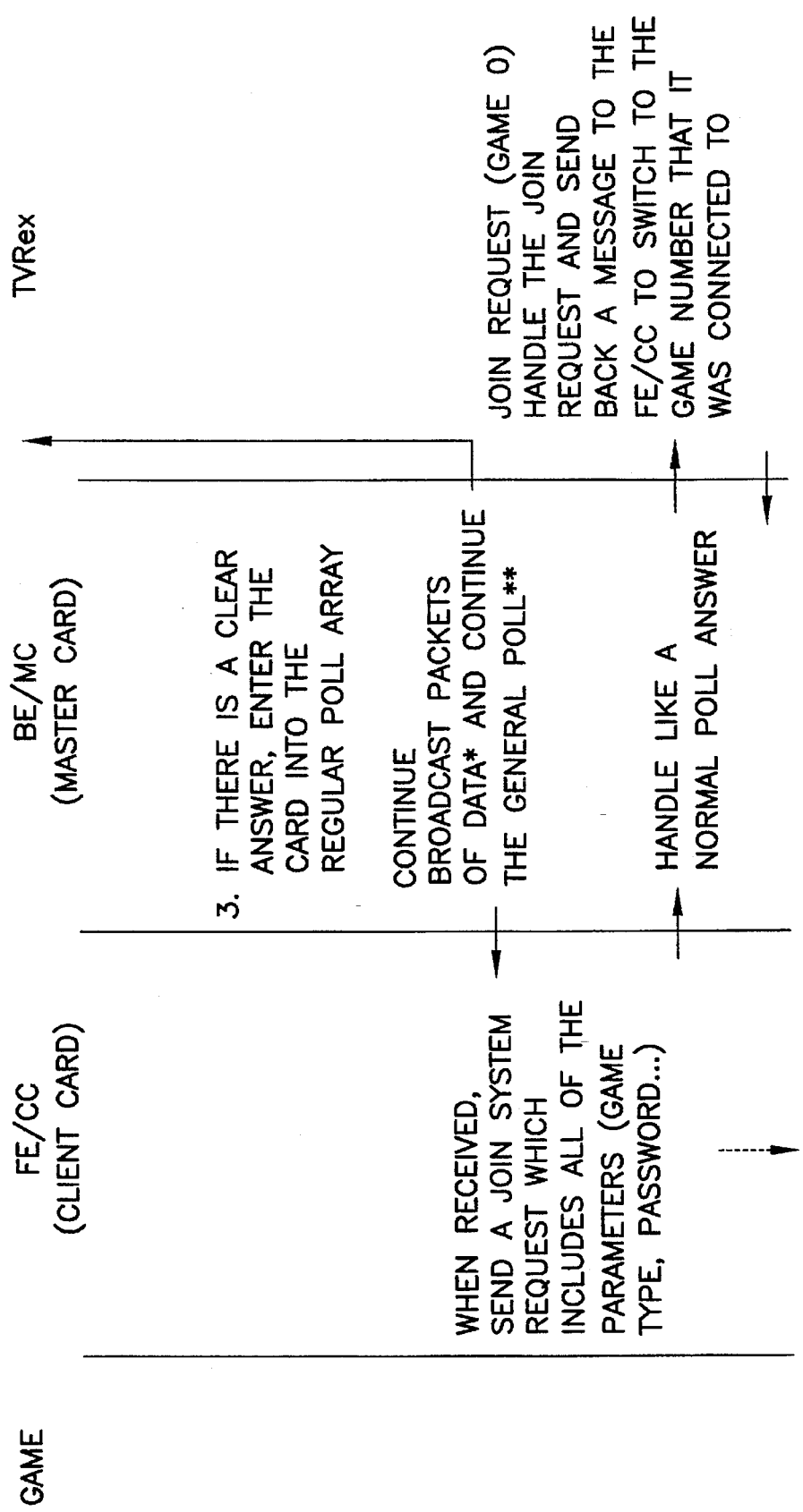
Figure 16C:
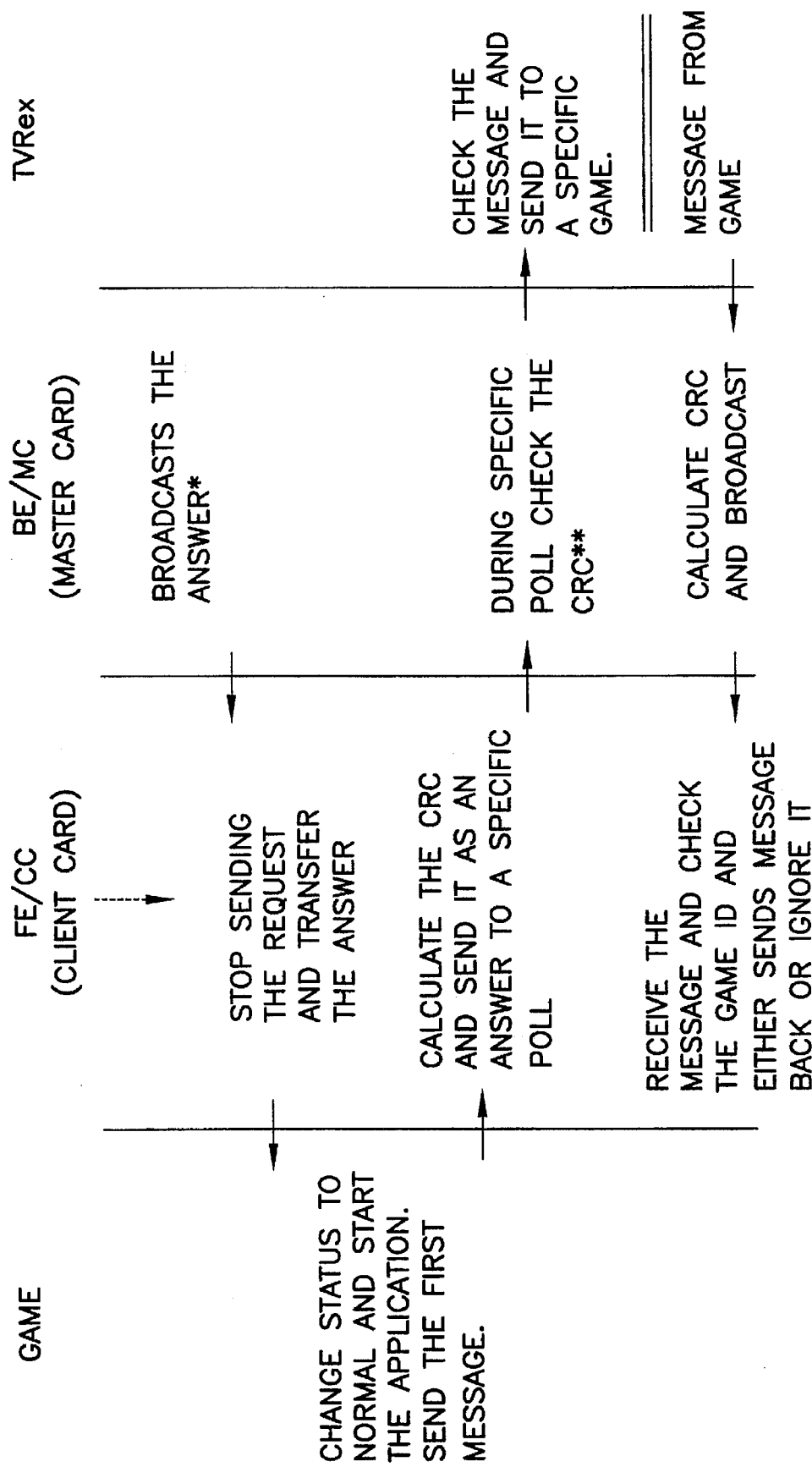

FIG. 15 is a software flow chart for the T5 Broadcast thread which passes data from specific game processes to users via mailslot 308. The mailslot entry for a data transmission in the context of the present invention is created at box 1501 of FIG. 15. The T5 thread reads the datapacket at 1502 which is to be broadcasted and checks the client number. The client number in the packet is checked at 1503 to determine if the client number is set to −1 (broadcast the message to all users). If the client number is −1, then control is passed to 1504 which sends the packet to all users on all frequencies. If the client number is no a −1, then the message is sent only to a specific client number in box 1506. Group join is an exception to this.

Control Flow of the Communications Protocol

FIGS. 16A, 16B and 16C are control flow timing diagrams showing the communication and process flow between the users and the server to join, play, change and quit any number of a plurality of provided games. FIGS. 16A, 16B and 16C show the interaction between the various levels of the system during communication. The major headings at the top of the drawings show the components of the system which are participating in the communication. The game heading refers to the user hardware and software component 101. The FE/CC heading refers to the FE (Front End) or CC (Client Card) 105 attached to the user's hardware equipment. The BE (Back End) or MC (Master Card) 104 refers to the communications card attached to the TVRex server. The TVRex heading refers to the hardware and software of the TVRex server 100.

To begin a game, the Game prepares a high level join request which includes the basic parameters of the player and the request. This information is passed to the FE card where a low-level join request is prepared. The BE card is polling during this time and creates a periodic general or join poll. The FE card receives the timing of the general poll and it responds during the join period by requesting to join the polling list. The FE card is persistent and continues to periodically request to join the polling list. The BE card processor handles polling join request either by allocating a polling time slot or by executing a collision algorithm to admit two or more requesting FE cards.

Referring to FIG. 16B, the processor of the BE card eventually adds the FE card to the polling list at the physical level. At this point the FE card makes a request to the logical level to join a game with the TVRex. The logical join request is handled through the T1 and T3 threads at the TVRex. The join request at the logical level is idled like a normal poll answer at the physical level by the BE card while the TVRex is working to admit the user to a game at the logical level. Thus, an FE card can be polled to the physical level even though the user has not been joined at the logical level. Referring to FIG. 16C, the processor of the BE card sends the answer from the TVRex to the join request over the cable to the FE card. The FE card will then stop its persistent sending of the join request and give the join status to the user's game hardware and software informing it that it has established a connection to the desired game in the TVRex server. At this point the user can begin playing the game and normal polling will continue between the FE and BE cards. Messages sent from the game application software component at the user hardware platform to the TVRex sever are sent through the FE card which now adds CRC checks to the packet. The packet is checked by the BE card and passed on to the TVRex server which forwards it to the game application software component running at the server site. In a similar fashion, messages from the game are passed through the TVRex server, through the BE card which adds CRC, over the cable and received by the FE card which passes the packets on to the game application software component at the user hardware platform.

Game Application Software

Game application are separate processes which are written to be run within the operating system environment of the present invention. The application software is typically sourced as two components: a server component and a user component. The user component may be written to run on a single type of hardware platform, or may alternatively be written to run on a wide variety of platforms such as a personal computer (such as an IBM-type PC, an Apple-type computer, Amiga, etc), a game console (such as Nintendo®, Sega®, Atari®, etc.) or a special set-top terminal. The information exchanged between the user site and the server site is status information on the game progress. The exchange of status information is contrasted with the exchange of update information since updates assume a secure communications channel and acknowledgement handshaking. In the present invention, the status of game players is continually transmitted at an approximate rate of 10 times per second. The system assumes that some status information will get lost along the way so the games replaced the old status of the game with new status information whenever the status information is received.

An example of the status information exchanged can be shown in an example of a video game in which the position of the players is critical. The player positions may be indicated in an XY-Cartesian coordinate system such that game player $P_N$ is at location $P_N$ $(x_N, y_N)$. To only transmit change information, the motion of player $P_1$ at location $P_1$ $(x_1, y_1)$ is indicated as a vector (direction and distance). If the message regarding the change in location is lost, all other game players are mistaken as to the true location of the player who changed position and the error compounds itself over time. In contrast to this, the present invention transmits status information in which the new locations of players is sent to each user. Thus, if any status packets are lost during transmission, no loss of position data is evident. The only noticeable anomaly would be that a player's position may jump from one position to another due to an intermediate loss of status information.

The status comes in two forms: status updates and status checksum. The status updates, described above, typically provide status on all game players. The status depends upon the game application, but the information is typically compressed in a code. Status checksums are periodically transmitted which provides a checksum value on the status of all players in a game. This checksum can be compared to the local games status as a shorthand check on the accuracy of the local status. If the checksum doesn't match, the local game can request a global status update from the server.

Game Arbitrator or Referee

Essential to the central control of the present invention is a game referee to make central decisions in a multi-player environment. The user hardware platforms cannot guarantee a fair or correct decision on who would win a particular encounter (such as who shot whom first). Thus a feature of the game application processes is to make a central decision based only upon the response packets received from the users, and not based upon the speed of the user hardware platform. Since one user may use an Intel® Pentium™-based processor and another user may use an Intel® 80286-based processor, the difference in processor speed should not be a deciding factor. Only the type of encounter and the response packets should be used in determining the winner.

Game Types

A wide variety of game type are available in the present system Many standard multi-player games are possible which number too many to list. By way of example and not by limitation, multi-player games types include a common (simulated) 3-D environment where each user can see and hunt the other users. Multi-player football, basketball, baseball and other multi-player sport games can be played. Classical board games and card games may be played. Two player and even single player games can be played. The game repertoire may include bulletin board service or messaging games to send and receive information. The game applications may include polls taken of cable subscribers, lottery games, gambling games, movie selection voting, and the like. The term game applications used throughout the present patent application is envisioned to encompass all types of application games running as context switched processes on the TVRex server platform.

Game Environments

An entire game environment or cyber community is possible with the preferred embodiment of the present invention. Separate game applications can be linked though a central environment which could share or pass parameter regarding a particular user so that moving from one game environment to another would terminate the billing cycles for the game switch but the user could carry points, status, possessions, attributes, etc., from one game to another. This would be very much like walking down a street in a large game cyber community and graphically walking into different storefronts to join different games in a virtual arcade. The cyber community may also provide information services, and mail between users such as leaving messages and information for other users. The present invention may also operate using different communications medium such as fiber optic cabling, wireless communication, analog or digital cellular communications and the like. The present invention supports such an environment and such an environment is envisaged as a product of the spirit and the scope of the preferred embodiment of the present invention.

Conclusion

Although specific embodiments have been illustrated and described herein, it will be appreciated by those of ordinary skill in the art that any arrangement which is calculated to achieve the same purpose may be substituted for the specific embodiment shown. This application is intended to cover any adaptation or variations of the present invention. Therefore, it is manifestly intended that this invention be limited only by the claims and the equivalents thereof.

What is claimed is:

1. A multi-user game playing network for attachment to a cable communication network, comprising:

a game server having a multi-threaded multi-processing operating system and located at a cable headend, including:

a first process thread operable for receiving uplink communication packets;

a second process thread operable for sending downlink communications packets;

a plurality of game processes, each capable of executing a first component of a specific game process and each logically connected to the first and second process threads for sending and receiving communication packets;

a first deterministic communications interface connected to the first and second process threads for transmitting and receiving the uplink and downlink communications packets onto the bidirectional cable communications network using a full duplex communications protocol;

at least one user station being connected to the bidirectional cable communications network and including:

a second deterministic communications interface for transmitting and receiving the uplink and downlink communications packets from the bidirectional cable communications network;

a game processor and user interface capable of executing a second component of one of the plurality of game processes, the second component being connected to the second communications interface for sending and receiving communications packets.

2. The multi-user game playing network of claim 1 wherein the first and second deterministic communications interfaces communicate using full duplex TDMA protocol.

3. The multi-user game playing network of claim 1 wherein the first and second deterministic communications interfaces communicate using full duplex FDMA protocol.

* * * * *